(12) United States Patent
Yamada et al.

(10) Patent No.: US 10,733,459 B2
(45) Date of Patent: Aug. 4, 2020

(54) IMAGE PROCESSING DEVICE, IMAGE PROCESSING METHOD, COMPUTER-READABLE RECORDING MEDIUM, OBJECT RECOGNITION DEVICE, DEVICE CONTROL SYSTEM, AND MOVABLE BODY

(71) Applicant: RICOH COMPANY, LTD., Tokyo (JP)

(72) Inventors: Yuu Yamada, Kanagawa (JP); Soichiro Yokota, Kanagawa (JP); Sadao Takahashi, Kanagawa (JP); Shinichi Sumiyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 152 days.

(21) Appl. No.: 16/126,496

(22) Filed: Sep. 10, 2018

(65) Prior Publication Data

US 2019/0026569 A1    Jan. 24, 2019

Related U.S. Application Data

(63) Continuation of application No. PCT/JP2016/087876, filed on Dec. 20, 2016.

(30) Foreign Application Priority Data

Mar. 18, 2016  (JP) ................................. 2016-056311

(51) Int. Cl.
*G06K 9/00* (2006.01)
*G08G 1/16* (2006.01)
(Continued)

(52) U.S. Cl.
CPC ..... *G06K 9/00798* (2013.01); *G06K 9/00805* (2013.01); *G06K 9/4638* (2013.01);
(Continued)

(58) Field of Classification Search
None
See application file for complete search history.

(56) References Cited

U.S. PATENT DOCUMENTS 7,787,712 B2    8/2010  Takahashi et al.
8,346,105 B2    1/2013  Takahashi et al.
(Continued)

FOREIGN PATENT DOCUMENTS

CN    102667640 B    2/2015
JP    63-316186    12/1988
(Continued)

OTHER PUBLICATIONS

Extended European Search Report dated Feb. 21, 2019 in European Patent Application No. 16894599.6. citing documents AX and AY therein, 10 pages.
(Continued)

*Primary Examiner* — Vikkram Bali
(74) *Attorney, Agent, or Firm* — Xsensus LLP

(57) ABSTRACT

An image processing device includes: a generating unit that generates, based on a distance image, two-dimensional distribution information indicating a two-dimensional distribution of an object, in which a distance in a horizontal direction, a distance in a depth direction, and a frequency value corresponding to the distances are related; and a labeling unit that conducts a labeling process by conducting search on the two-dimensional distribution information multiple times, detecting a pixel having the frequency value that is more than a predetermined threshold during each search, and assigning a label that is different in each times of search, wherein the labeling unit conducts a first labeling process by selecting a pixel having the frequency value that is more than the threshold from pixels that abut a pixel being
(Continued)

searched in a search direction and assigning the label when the label is not assigned to the pixel selected.

16 Claims, 23 Drawing Sheets

(51) Int. Cl.
  *G06T 1/00* (2006.01)
  *G06K 9/46* (2006.01)
  *G06K 9/62* (2006.01)
(52) U.S. Cl.
  CPC ......... *G06K 9/4642* (2013.01); *G06K 9/6228* (2013.01); *G06T 1/00* (2013.01); *G08G 1/16* (2013.01)

(56) References Cited

U.S. PATENT DOCUMENTS

| | | |
|---|---|---|
| 9,443,294 B2 | 9/2016 | Sumiyoshi |
| 2007/0195070 A1 | 8/2007 | Takahashi et al. |
| 2007/0195370 A1 | 8/2007 | Suga et al. |
| 2011/0222732 A1 | 9/2011 | Higuchi et al. |
| 2012/0242835 A1 | 9/2012 | Li et al. |
| 2013/0057707 A1 | 3/2013 | Hasegawa et al. |
| 2014/0267630 A1* | 9/2014 | Zhong ................ H04N 13/204 348/47 |
| 2015/0049195 A1 | 2/2015 | Ishigaki et al. |
| 2015/0294160 A1 | 10/2015 | Takahashi et al. |
| 2015/0332103 A1 | 11/2015 | Yokota et al. |
| 2015/0334269 A1 | 11/2015 | Yokota et al. |
| 2016/0014406 A1 | 1/2016 | Takahashi et al. |
| 2016/0019429 A1 | 1/2016 | Ishigaki et al. |
| 2016/0301912 A1 | 10/2016 | Saitoh et al. |

FOREIGN PATENT DOCUMENTS

| | | |
|---|---|---|
| JP | 01-302475 | 12/1989 |
| JP | 06-266828 | 9/1994 |
| JP | 2010-018062 | 1/2010 |
| JP | 5094658 | 9/2012 |
| JP | 2014-225220 | 12/2014 |

OTHER PUBLICATIONS

Iloie, A., et al.. "UV disparity based obstacle detection and pedestrian classification in urban traffic scenarios", 2014 IEEE 10$^{th}$ International Conference on Intelligent Computer Communication and Processing, XP032671049, Sep. 4, 2014, p. 119-125.

Oniga,F., et al., "Fast Obstacle Detection using U-Disparity Maps with Stereo Vision", 2015 IEEE International Conference on Intelligent Computer Communication and Processing, XP032803401, Sep. 3, 2015, pp. 203-207.

International Search Report dated Feb. 14, 2017 in PCT/JP2016/087876 filed on Dec. 20, 2016 (with English Abstract).

Written Opinion dated Feb. 14, 2017 in PCT/JP2016/087876 filed on Dec. 20, 2016.

Office Action dated Jan. 2, 2020 issued in corresponding Chinese Patent Application No. 201410354002.0 with English Translation, 12 pages.

* cited by examiner

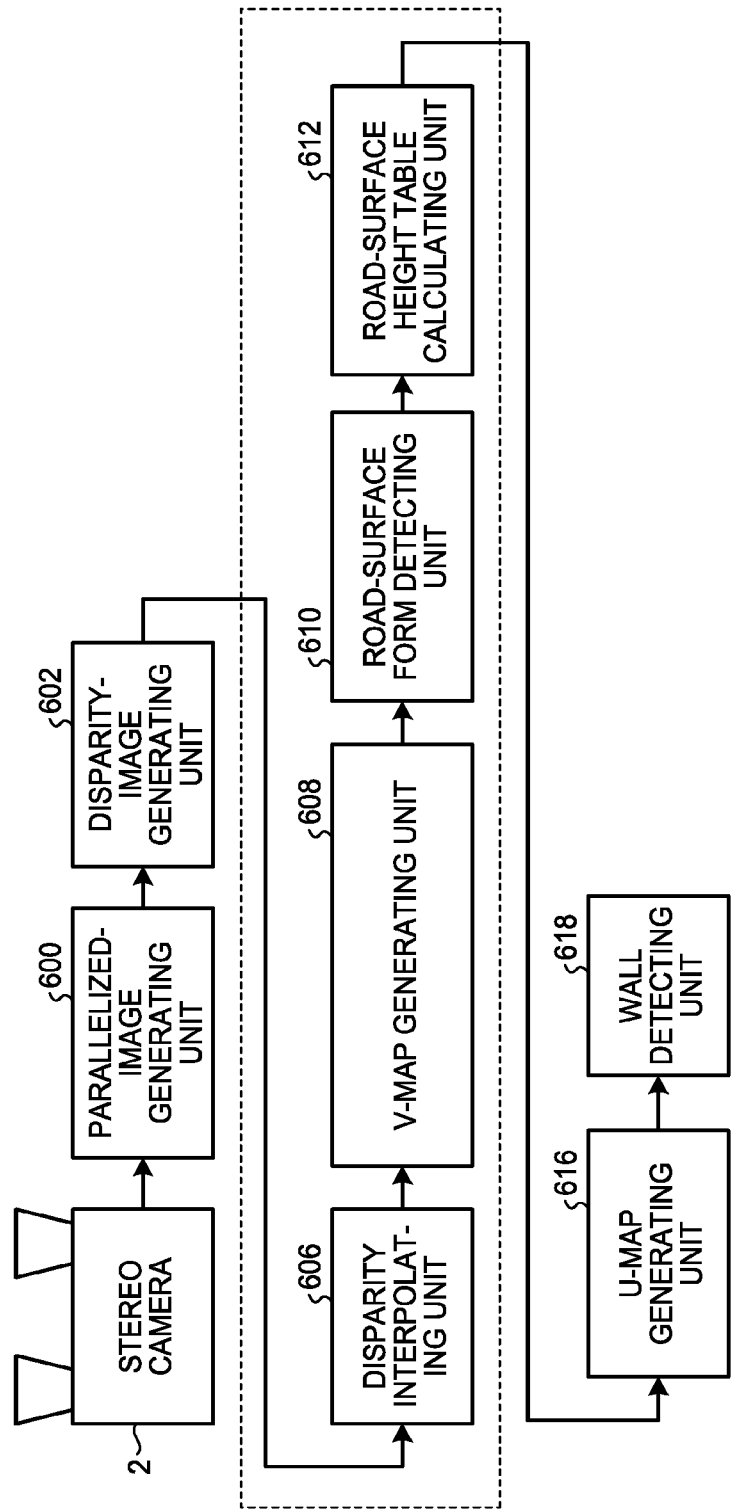

CAPTURED IMAGE

DECIMATED DISPARITY

NO DECIMATION IN LONG DISTANCE (MORE THAN 50 m), DECIMATION BY 1/2 IN INTERMEDIATE DISTANCE (20 m TO 50 m), DECIMATION BY 1/3 IN SHORT DISTANCE (10 m TO 20 m), AND DECIMATION BY 1/8 IN SHORTEST DISTANCE (LESS THAN 10 m)

ACTUAL DISTANCE

U MAP

CAPTURED IMAGE

U MAP

LABELING RESULT

SELECTION OF
LABELING RESULT

U MAP

IMAGE OF LABELING

LABELING RESULT

LABELING RESULT

OBJECT PROCESSING AREA
BEFORE ID EXPANSION

OBJECT PROCESSING AREA
AFTER ID EXPANSION

CAPTURED IMAGE

U MAP

CAPTURED IMAGE

U MAP

LABELING RESULT

LABELING RESULT

LABELING RESULT

IMAGE PROCESSING DEVICE, IMAGE PROCESSING METHOD, COMPUTER-READABLE RECORDING MEDIUM, OBJECT RECOGNITION DEVICE, DEVICE CONTROL SYSTEM, AND MOVABLE BODY

CROSS-REFERENCE TO RELATED APPLICATIONS

This application is a continuation of PCT international application Ser. No. PCT/JP2016/087876 filed on Dec. 20, 2016 which designates the United States, incorporated herein by reference, and which claims the benefit of priority from Japanese Patent Applications No. 2016-056311, filed on Mar. 18, 2016, incorporated herein by reference.

BACKGROUND OF THE INVENTION

1. Field of the Invention

Embodiments relate to an image processing device, an image processing method, a computer-readable recording medium, an object recognition device, a device control system, and a movable body.

2. Description of the Related Art

Nowadays, body structures of automobiles, and the like, have been developed in terms of safety of automobiles as to how pedestrians and occupants in an automobile are protected during crashes with pedestrians, automobiles, or the like. In recent years, there are known technologies of detecting persons, automobiles, and the like, at high speed due to improvements in information processing technologies and image processing technologies. There are known automobiles that use these technologies to prevent crashes before happens by automatically applying a brake before crashes. In the case of these automobiles, the distance to a person, a different automobile, or the like, is measured by using a millimeter-wave radar device, a laser radar device, or a stereo camera device, and in accordance with a distance measurement result, brake control is conducted. Thus, it is possible to automatically apply a brake in accordance with a distance to a person, a different automobile, or the like.

Japanese Laid-open Patent Publication No. 6-266828 discloses a vehicle-exterior monitoring device for vehicles that detects, as a side wall, a three-dimensional stretching object that is a boundary on a road, such as guardrail, shrubbery, or line of pylons. The vehicle-exterior monitoring device for vehicles uses a stereo optical system to capture objects within an installation area outside the vehicle. A stereo image processing device calculates the distance distribution over the entire captured image of a stereo optical system 10. A road/side-wall detection device calculates the three-dimensional position of each area of the object that corresponds to the distance distribution. Then, the road/side-wall detection device uses information on the calculated three-dimensional position to detect the shape of the road and the side wall.

Unfortunately, when an object is detected by using a captured image of the stereo camera device, there is a possibility that for example a side wall arranged along the curved road is mistakenly detected as a vehicle or pedestrian.

Furthermore, when a stretching object is overlapped with a different object, for example, a leading vehicle is overlapped with a side wall arranged along a curved road in a captured image, there is a possibility that they are mistakenly detected as a single object.

In consideration of the above-described problem, there is a need to provide an image processing device, an image processing method, a computer-readable recording medium, an object recognition device, a device control system, and a movable body capable of accurately detecting three-dimensional stretching objects.

SUMMARY OF THE INVENTION

According to an embodiment, an image processing device includes a generating unit that generates, based on a distance image, two-dimensional distribution information indicating a two-dimensional distribution of an object, in which a distance in a horizontal direction, a distance in a depth direction, and a frequency value corresponding to the distance in the horizontal direction and the distance in the depth direction are related; and a labeling unit that conducts a labeling process by conducting search on the two-dimensional distribution information multiple times, detecting a pixel having a frequency value that is more than a predetermined threshold during each search, and assigning a label that is different in each times of search. Furthermore, the labeling unit conducts a first labeling process by selecting a pixel having a frequency value more than the threshold from pixels that abut a pixel being searched in a search direction and assigning the label when the label is not assigned to the pixel selected.

BRIEF DESCRIPTION OF THE DRAWINGS

FIG. 4 is a functional block diagram of each function performed when an object authentication program is executed;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
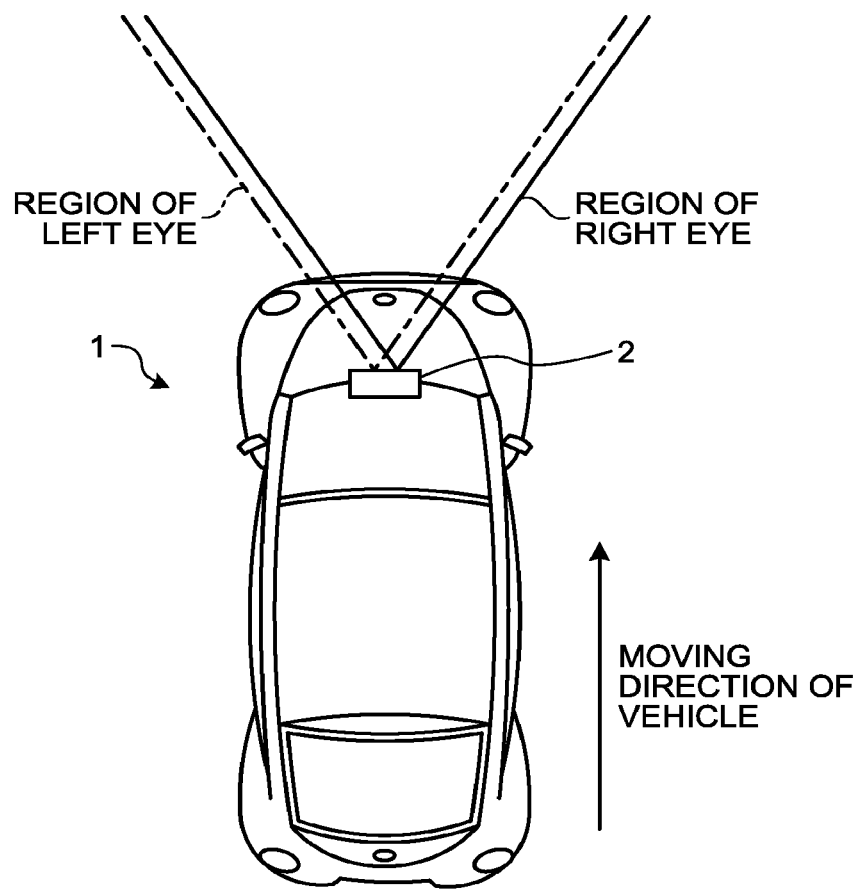
FIG. 1 is a diagram that illustrates a vehicle in which a device control system according to a first embodiment is installed.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the drawings, a device control system according to an embodiment is explained below.

First Embodiment

First, FIG. 1 illustrates a vehicle 1 that is an example of a movable body provided with a device control system according to a first embodiment. As it is understood from FIG. 1, a stereo camera 2 of the device control system is provided on the front windshield side of the vehicle 1. The stereo camera 2 captures images within a capturing range in the front in a traveling direction of the vehicle 1. The stereo camera 2 includes two image sensors 22 as described later with reference to FIG. 3, and it captures two images in the region of the left eye and in the region of the right eye.

Figure 2:
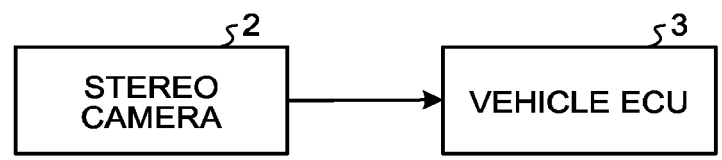
FIG. 2 is a diagram that illustrates an example of the configuration of a stereo camera installed in the vehicle and the periphery.

FIG. 2 is a diagram that illustrates an example of the configuration of the stereo camera 2 and the periphery included in the vehicle 1. The stereo camera 2 outputs for example two captured images to a vehicle ECU (engine control unit) 3. The ECU 3 is provided in the vehicle 1, and it conducts electric control and processing of the engine, the brake, and the like, of the vehicle 1 in an integrated manner. Furthermore, the ECU 3 generates a distance image (e.g., a disparity image that corresponds to disparity of each captured image) from two captured images and detects a three-dimensional object as described later. Then, the ECU 3 controls the brake of the vehicle, handling, and the like, in accordance with detection results.

Figure 3:
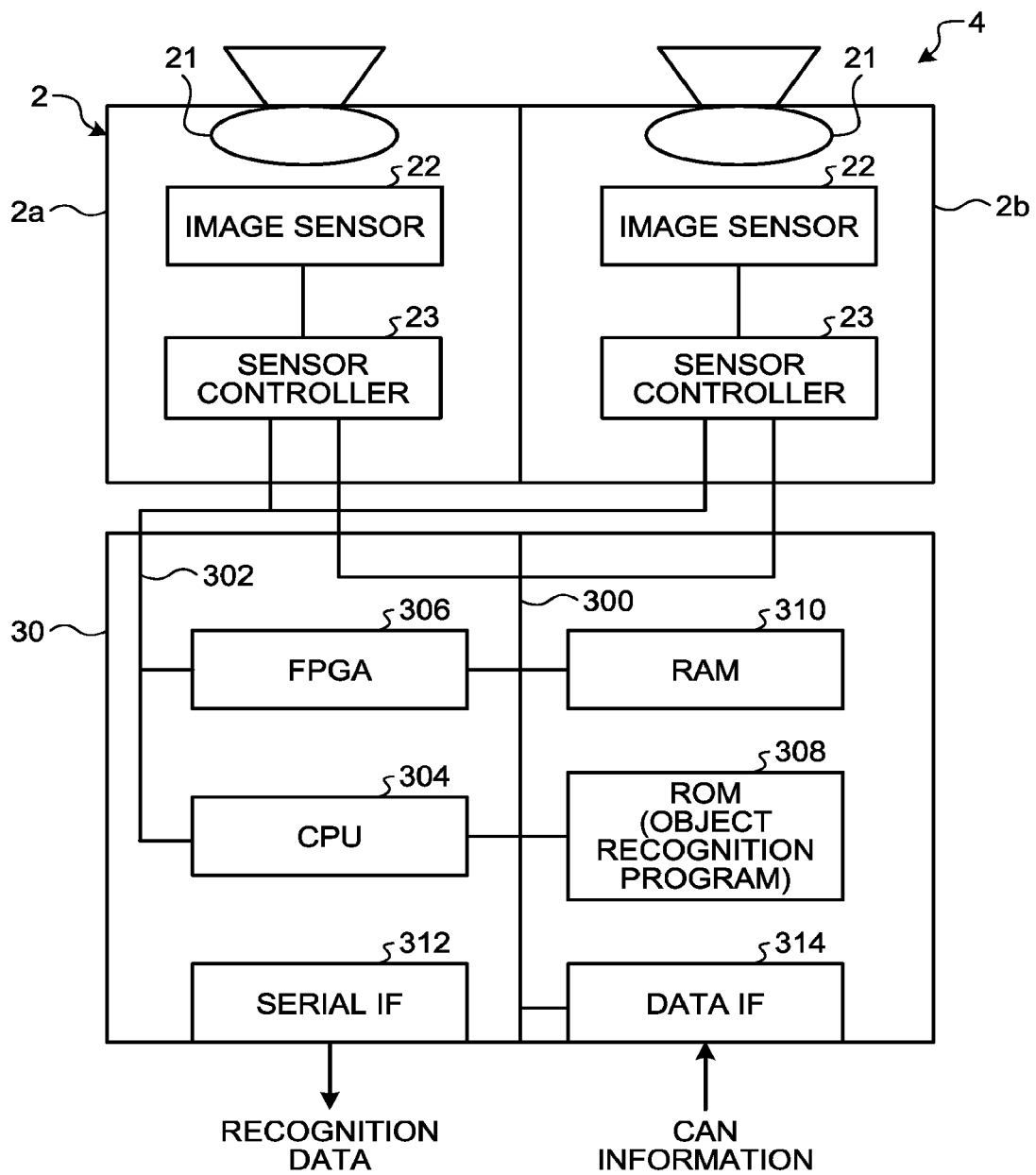
FIG. 3 is a diagram that illustrates an example of the configuration of an object recognition device including the stereo camera.

FIG. 3 is a diagram that illustrates an example of the configuration of an object recognition device 4 including the stereo camera 2. The object recognition device 4 includes for example the stereo camera 2 and an image processing device 30. In the stereo camera 2, a camera unit 2a for the left eye and a camera unit 2b for the right eye are assembled in a parallel (horizontal) fashion, and each of them captures moving images (or still images) in the target capturing range.

Each of the camera units 2a, 2b includes a lens 21, the image sensor 22, and a sensor controller 23. The image sensor 22 is, for example, a CCD (charge coupled device) image sensor or a CMOS (complementary metal-oxide semiconductor) image sensor. The sensor controller 23 conducts for example exposure control, image reading control, communication with external circuits, and transmission control on image data for the image sensor 22.

The image processing device 30 is provided in for example the ECU 3 illustrated in FIG. 2. The image processing device 30 includes, for example, a data bus line 300, a serial bus line 302, a CPU (central processing unit) 304, an FPGA (field-programmable gate array) 306, a ROM (read only memory) 308, a RAM (random access memory) 310, a serial IF (interface) 312, and a data IF (interface) 314.

The above-described stereo camera 2 is connected to the image processing device 30 via the data bus line 300 and the serial bus line 302. The CPU 304 controls the overall operation of the image processing device 30 and conducts image processing and image recognition processing. Luminance image data on captured images that are captured by the image sensors 22 in the camera units 2a, 2b is written in the RAM 310 of the image processing device 30 via the data bus line 300. Control data for changing sensor exposure values, control data for changing image reading parameters, various types of setting data, and the like, are transmitted and received to and from the CPU 304 or the FPGA 306 via the serial bus line 302.

The FPGA 306 generates disparity images by conducting disparity calculations using for example gamma correction, distortion correction (parallelization of right and left images), and block matching, which are processes that require real-time performance, on image data stored in the RAM 310 and writes them again in the RAM 310. The CPU 304 performs control on each of the sensor controllers 23 in the stereo camera 2 and performs overall control on the image processing device 30. Furthermore, the ROM 308 stores an object recognition program for conducting status recognition, prediction, object recognition, and the like.

The object recognition program is an example of image processing programs. The CPU 304 acquires for example CAN (controller area network) information on the vehicle as parameters (vehicle speed, acceleration, rudder angle, yaw rate, or the like) via the data IF 314. Furthermore, the CPU 304 performs various types of processing for status recognition, and the like, by using luminance image data and disparity image data stored in the RAM 310 in accordance with the object recognition program stored in the ROM 308, thereby detecting (recognizing) detection targets such as leading vehicle and side walls. Furthermore, the CPU 304 also performs a process to discard image data.

Detection data (recognition data) on the detection target (recognition target) is output to for example an automatic brake system or an automatic speed control system with a control function provided in the ECU 3 via the serial IF 312. The automatic brake system performs brake control on the vehicle 1 by using recognition data on the recognition target. Furthermore, the automatic speed control system performs speed control on the vehicle 1 by using recognition data on the recognition target. Although a vehicle is an example of a movable body in the explanation below, the device control system according to the present embodiment is applicable to vessels, aircrafts, robots, and the like.

Next, the CPU 304 executes an object authentication program to perform each function illustrated in the functional block diagram of FIG. 4. That is, the CPU 304 executes the object authentication program to function as a parallelized-image generating unit 600, a disparity-image generating unit 602, a disparity interpolating unit 606, and a V-map generating unit 608. Furthermore, the CPU 304 executes the object authentication program to function as a road-surface form detecting unit 610, a road-surface height table calculating unit 612, a U-map generating unit 616, and a wall detecting unit 618. Furthermore, for the convenience of explanation, the word "map" is used; however, it should be noted that, in actuality, information like maps or images is not formed but set of information indicating two-dimensional distribution of objects is formed, in which a position in a horizontal direction is related to a position in a depth direction, or the like.

The U-map generating unit 616 is an example of a generating unit. Furthermore, the wall detecting unit 618 is an example of a labeling unit and a detecting unit.

In FIG. 4, with regard to one frame of images (two images in the region of the left eye and in the region of the right eye), time-series stereo images captured by the stereo camera 2, one of them is fed as the reference image to the parallelized-image generating unit 600, and the other one of them as a comparison image. The parallelized-image generating unit 600 performs a parallelized-image generation process. The disparity-image generating unit 602 performs a disparity-image generation process to generate disparity image data (disparity image information).

The disparity interpolating unit 606 performs a disparity-image interpolation process. The V-map generating unit 608 generates a V map on the basis of each pixel value for which a voting area is limited. The road-surface form detecting unit 610 and the road-surface height table calculating unit 612 calculate the height of a road surface before the V map that corresponds to a disparity image is completely generated.

The U-map generating unit 616 generates two types of U maps with a high resolution and a low resolution representing the frequency distribution of a disparity value of a disparity image in a horizontal direction. Hereinafter, a high-resolution U map is referred to as "real U map", and a low-resolution U map as "small U map". The wall detecting unit 618 detects an area where pixels having a frequency value continue in a depth direction on a small U map generated by the U-map generating unit 616. Furthermore, when a gap in a depth direction is less than a predetermined threshold, the wall detecting unit 618 determines that it is connected; thus, detection accuracy is improved. Furthermore, when a successive area has a length that is more than a predetermined threshold, the wall detecting unit 618 detects it as a wall.

That is, by using small U maps, the wall detecting unit 618 reduces the effect of disparity variance and conducts detection due to labeling of image processing. Furthermore, as an image size is small, high-speed detection is possible. When a wall is detected, the wall and an area outside it (wall outside area) are determined, and the wall outside area is not processed.

Figure 5A:
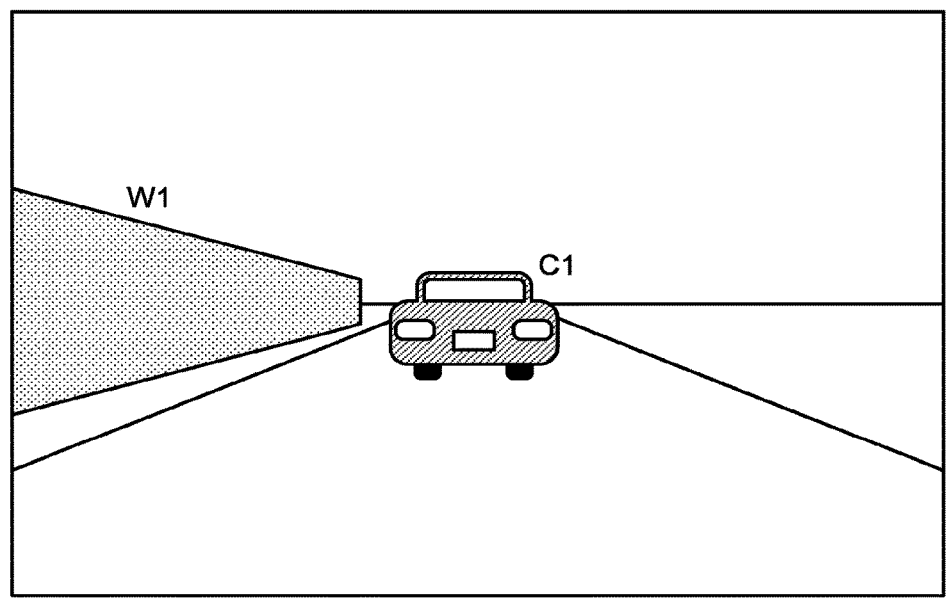
FIGS. 5A and 5B are schematic diagrams that illustrate a real U-map generation operation of a real U-map generating unit.
Figure 5B:
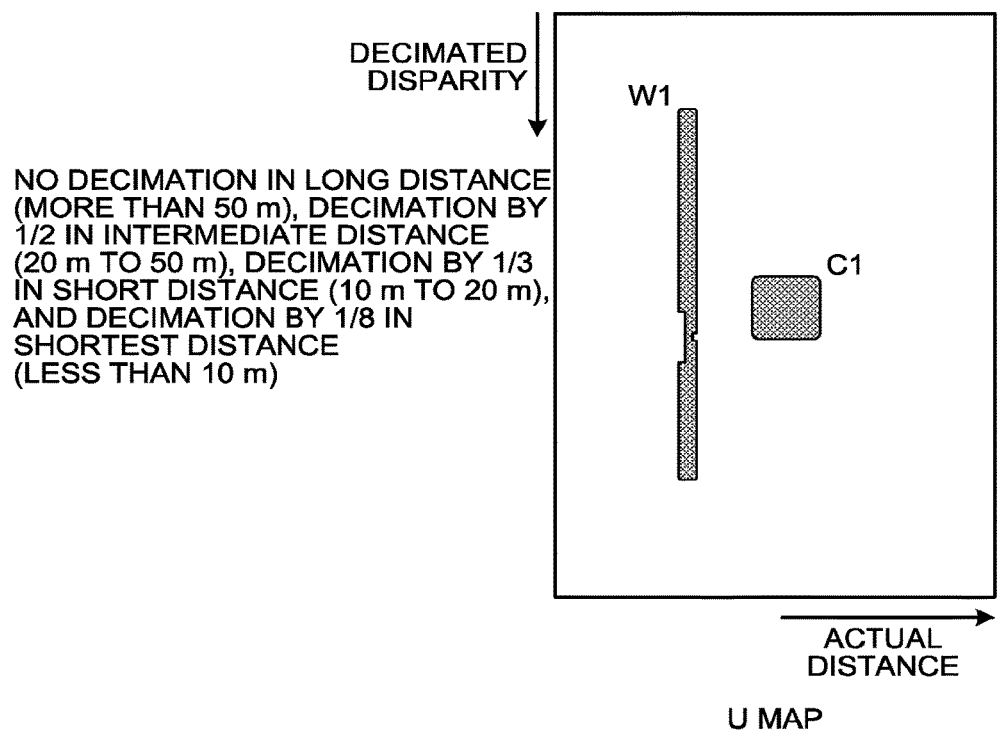

Next, a U-map generation operation is explained. FIGS. 5A and 5B are schematic diagrams that illustrate a U-map generation operation of the U-map generating unit 616. The diagram illustrated in FIG. 5A is a luminance image of a captured image that is captured by the stereo camera 2. Furthermore, the diagram illustrated in FIG. 5B is the high-resolution U map (real U map) that corresponds to the luminance image in FIG. 5A. For the real U map, the horizontal axis of the above-described U map has been converted from a unit of pixels of the image into a unit of the actual distance (e.g., a distance from a straight line extending in a longitudinal direction of a captured image). That is, the horizontal axis of a real U map is the actual distance in a horizontal direction of a captured image. Furthermore, the vertical axis of a real U map is a decimation disparity value on which decimation has been conducted as described later. As a disparity value is equivalent to a distance in a depth direction, the real U map is a map of a two-dimensional histogram that is generated by relating a horizontal-direction distance (actual distance), a depth-direction distance (disparity value), and the occurrence frequency (frequency value) of a disparity value.

For this type of real U maps, the horizontal axis and the vertical axis may be values that correspond to the horizontal-direction distance and the depth-direction distance, respectively. For example, a distance in a depth direction may be used instead of disparity on the vertical axis, and a value obtained by compressing a horizontal-direction distance at a predetermined rate, or the like, may be used instead of a horizontal-direction distance on the horizontal axis. Here, for convenience, explanation is given by using the vertical axis and the horizontal axis; however, it does not matter whether they are represented on the axes as long as they are correlated as values.

Furthermore, real U maps use the unit called "decimated disparity" that uses a decimation percentage that corresponds to a distance from disparity of a U map on the vertical axis. In the case of a long distance, as objects are small, there is little disparity information and a distance resolution is low; therefore, decimation is not conducted. Conversely, in the case of a short distance, as objects appear large, there is much disparity information and a distance resolution is high; therefore, decimation may be conducted to a large extent on the vertical axis.

In the case of the real U map illustrated in FIG. 5B, the shape of the back side of a vehicle C1 is represented as a square area in the central part of the map, and a wall W1 is represented as a linear area that is located on the left side of the vehicle C1 and that extends (vertically) upward. For example, in the case of the device control system according to the first embodiment, to detect three-dimensional stretching objects, the U-map generating unit 616 generates a small U map that is a U map with such a low resolution on the horizontal axis that there is some difficulties in detecting three-dimensional objects (e.g., vehicles or persons) that are not stretching. Furthermore, to detect three-dimensional objects that are not stretching, the U-map generating unit 616 generates a real U map that is a high-resolution U map together with the above-described small U map. That is, the U-map generating unit 616 generates both a low-resolution small U map and a high-resolution real U map.

Figure 6A:
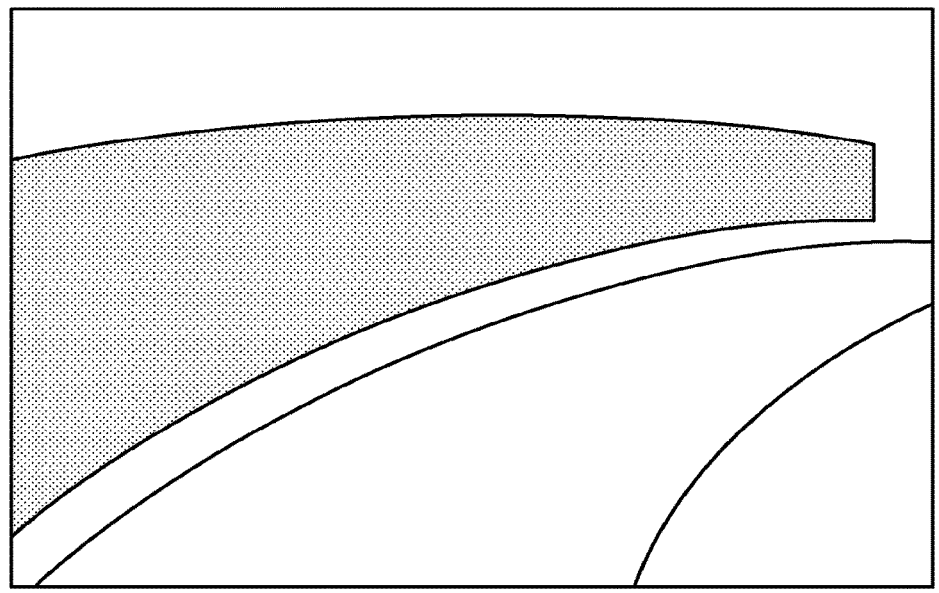
FIGS. 6A and 6B are diagrams that illustrate a luminance image and a small U map when the vehicle is turning right along the wall.
Figure 6B:
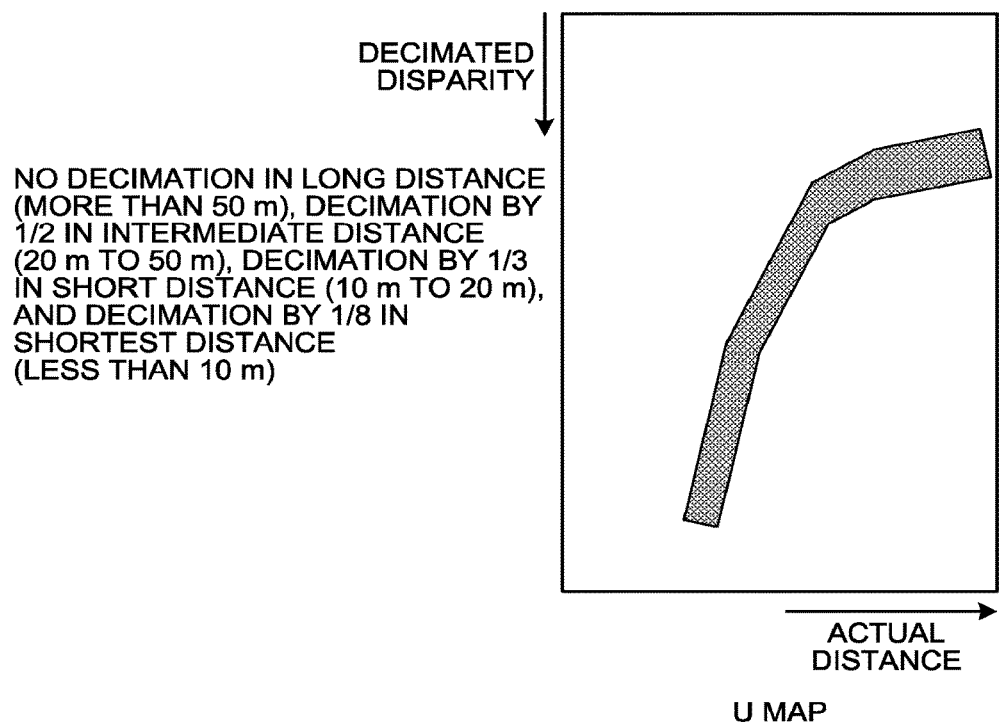

FIG. 6A illustrates a luminance image when the vehicle is turning right along the wall. Furthermore, FIG. 6B illustrates a small U map on which the wall (the side wall provided along the right-hand curve of the road), which corresponds to the luminance image in FIG. 6A, is voted. This small U map is a small U map that is formed by not decimating disparity when the actual distance is a long distance (equal to or more than 50 m) but by decimating disparity by ½ when the actual distance is an intermediate distance (equal to or more than 20 m and less than 50 m). Furthermore, this small U map is a small U map that is formed by decimating disparity by ⅓ when the actual distance is a short distance (equal to or more than 10 m and less than 20 m) and decimating disparity by ⅛ when the actual distance is the shortest distance (less than 10 m).

The device control system according to the first embodiment conducts a labeling process (hereafter, referred to as turning-wall labeling process or simply as labeling process) that gives priority to a depth direction while considering continuousness in a horizontal direction. Thus, as illustrated in FIG. 6B, it is possible to detect the object that appears on the small U map along the curved road and that is stretching in a depth direction. That is, when a vehicle is turning, or the like, the side wall provided along the curving road, for example, is detected with accuracy separately from other objects such as a leading vehicle.

Figure 7A:
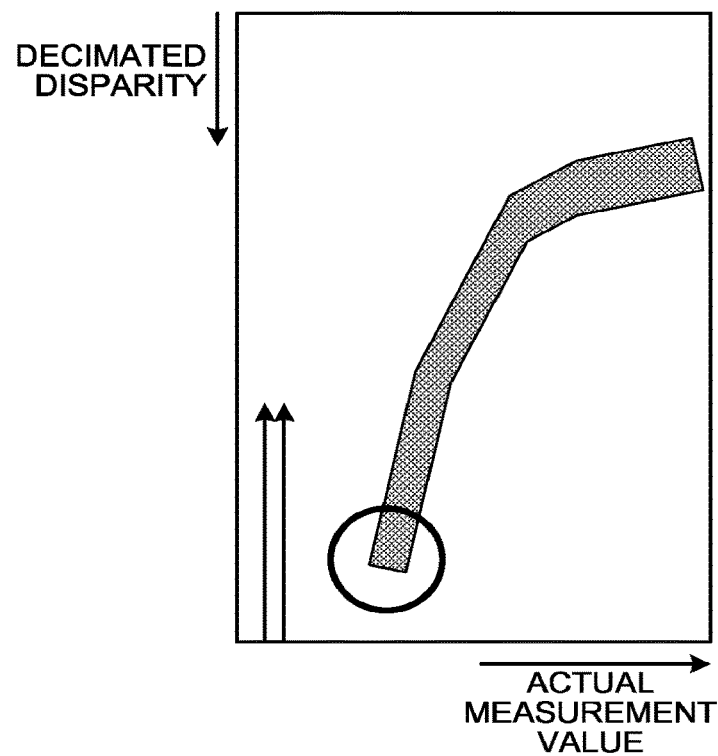
FIGS. 7A and 7B are diagrams that illustrate a small U map that corresponds to the captured image of the side wall curving to the right and enlarged pixels that correspond to the start point of the side wall on the small U map.
Figure 7B:
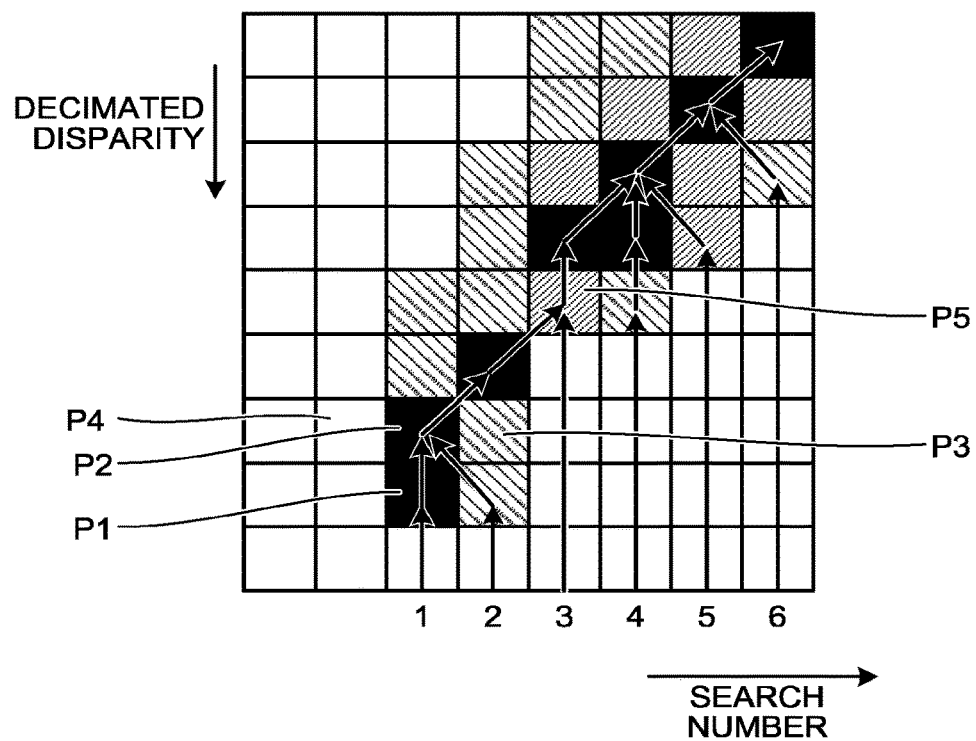

Next, an explanation is given of steps of the basic process of the turning-wall labeling process by the wall detecting unit 618. FIG. 7A is a small U map that corresponds to the captured image of the side wall curving to the right as illustrated in FIG. 6A. Furthermore, FIG. 7B is an enlarged view of pixels that correspond to the start point of the side wall on the small U map of FIG. 7A. The wall detecting unit 618 searches the small U map generated by the U-map generating unit 616 from the bottom (from a position in the shortest distance) of the small U map on a column-by-column basis as illustrated in FIG. 7B and assigns a predetermined labeling number (an example of label) to an initially detected pixel P1 having a frequency value more than a predetermined threshold as the pixel that corresponds to the start point of the side wall. When a different labeling number has been already assigned to the detected pixel P1, the wall detecting unit 618 does not assign a new labeling number but proceeds to searching in the next column.

During the first search on the small U map, the wall detecting unit 618 assigns the labeling number "1" to pixels having a frequency that is more than the predetermined threshold. Furthermore, during the second search on the small U map, the labeling number "2" is assigned to pixels having a frequency value that is more than the predetermined threshold. That is, the wall detecting unit 618 conducts a labeling process by changing labeling numbers while changing search areas.

Furthermore, sometimes there are no pixels having a frequency value like for example the two columns on the left side illustrated in FIG. 7B. When the wall detecting unit 618 has not detected any pixels having a frequency value during search until a predetermined distance, it cancels searching the column. Then, the column to be searched is changed to the next column, and a pixel having a frequency value is detected. In the example illustrated in FIG. 7B, as there are no pixels having a frequency value on the two columns on the left side, the wall detecting unit 618 cancels searching at a predetermined distance and changes the column to be searched to the third column. This allows a reduction in a search time.

Then, after assigning a labeling number to the pixel P1 having a frequency value, the wall detecting unit 618 selects the next pixel on which a labeling process is conducted from three pixels in total, i.e., a pixel P2 that is present on the next row above the row of the pixel P1 with the labeling number assigned thereto and that is adjacent to the pixel P1 with the labeling number assigned thereto (the pixel above the pixel with the labeling number assigned thereto); a pixel P3 that is on the immediate right of the pixel P2 that is above the pixel P1 with the labeling number assigned thereto; and a pixel P4 that is on the immediate left of the pixel P2 that is above the pixel P1 with the labeling number assigned thereto. The wall detecting unit 618 selects the pixel with the highest frequency value from the three pixels and conducts a labeling process. In this example, it is assumed that a labeling process is conducted on the pixel P2 above the pixel P1.

Here, the next pixel on which a labeling process is conducted is selected from the above-described three pixels. However, this is an example, and any number of pixels at any positions may be candidates selected as the next pixel on which a labeling process is conducted, for example, the next pixel on which a labeling process is conducted is selected from five pixels in total, i.e., the pixel above the pixel on which a labeling process has been conducted and two pixels on each of the immediate right and left of the pixel above.

In this way, the wall detecting unit 618 repeatedly performs operation to conduct a labeling process by selecting the pixel with the highest frequency from the three pixels in total, i.e., the pixel P2 above the pixel P1 on which a labeling process has been conducted and the pixels P4, P3 on the immediate right and left of the pixel above. In the example illustrated in FIG. 7B, during the first search, the wall detecting unit 618 performs a labeling process on the pixel P1 that corresponds to the start point of the side wall and then conducts a labeling process on each pixel, sequentially, up, upper right, upper right, up, . . . , as indicated by for example the arrow of the trajectory.

Next, it is assumed that during the second search, a labeling process is conducted on a pixel P5 that is on the immediate right of the pixel P1 on which a labeling process has been conducted during the first search. In this case, if the next pixel on which a labeling process is conducted is selected from the above-described three pixels, the pixel P2 selected during the first search is selected as the pixel on which a labeling process is to be conducted. In this case, as the labeling process has been completed for the pixel P2 during the first search, the wall detecting unit 618 terminates the second search when it is detected that the labeling process has been already conducted on the next pixel for a labeling process.

Next, the pixel P5 that is initially detected during the third search has already undergone a labeling process during the first search. For this reason, the wall detecting unit 618 terminates the third search without assigning any labeling number.

Figures 8A, 8B:
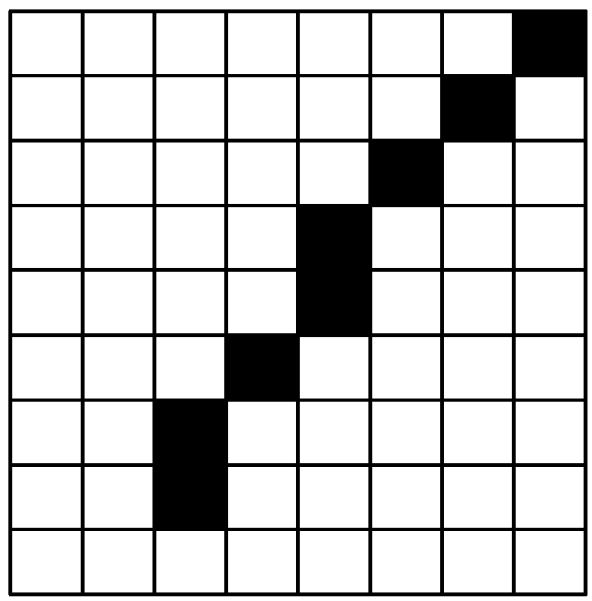
FIGS. 8A and 8B are diagrams that illustrate a labeling processing result of the small U map and the wall detected based on the labeling processing result.

By performing a labeling process in this manner, pixels that have undergone a labeling process during each search may be obtained as illustrated in FIG. 8A (labeling result). In FIG. 8A, the number in a pixel indicates the sequential order of search. Specifically, the pixel with the number "1" indicates a pixel obtained during the first search, and the pixel with the number "4" indicates a pixel obtained during the fourth search.

The wall detecting unit 618 extracts pixels having more than a predetermined length from such a labeling result, thereby detecting an elongated object (in this case, a side wall) that is stretching in a depth direction as illustrated in FIG. 8B.

Here, the wall detecting unit 618 may make a selection after applying a weight to three pixels on the next row above the pixel detected during each search. For example, vehicle information such as operation information on the steering wheel and (or) the rotation angular velocity (yaw rate) of a vehicle is acquired and, among the above-described three pixels, the wall detecting unit 618 applies a higher weight value to a pixel that corresponds to a turning direction of the vehicle than a weight value of a pixel that corresponds to the direction opposite to the turning direction of the vehicle and a pixel at the center and then selects a pixel on which the above-described labeling process is to be conducted. Specifically, when vehicle information indicating that the vehicle is turning right, for example, is acquired, the wall detecting unit 618 applies a higher weight value to the right pixel that corresponds to the right turning direction of the vehicle than a weight value of a pixel that corresponds to the left turning direction of the vehicle and a pixel at the center and then selects a pixel on which the above-described labeling process is to be conducted. Then, in this case, the wall detecting unit 618 cancels search without searching the left pixel (does not search for the left pixel).

Furthermore, while it is detected from vehicle information that turning is being performed, the wall detecting unit 618 conducts the above-described labeling process by shifting a search position in the turning direction by one pixel. Thus, search may be performed by following a pixel on which a labeling process needs to be conducted so that the pixel on which a labeling process needs to be conducted is detectable at the initial stage of search. Furthermore, by controlling the start position of search in this way, an elongated object that is stretching from the front side of a captured image may be detected with accuracy, and false detection may be reduced. Furthermore, by controlling the start position of search in this way, a search time may be reduced, and stretching objects such as walls may be detected at high speed.

Furthermore, as there are no pixels having a frequency value on the two columns on the left side of the pixel P1 (start pixel) illustrated in FIG. 7B, initially detected during for example the first search, search is a waste of time. For this reason, when there are no pixels having a frequency value within a predetermined area, the wall detecting unit 618 cancels search in the column. Furthermore, as the distance becomes longer, variance of disparity is larger, and when objects are connected on a small U map, they sometimes satisfy the condition of a length that is detected as a wall. However, according to the first embodiment, elongated objects that stretch from a position in a short distance are detected, whereby it is possible to prevent failures that connected objects are mistakenly detected as a successive and elongated object such as a wall.

Figure 9:
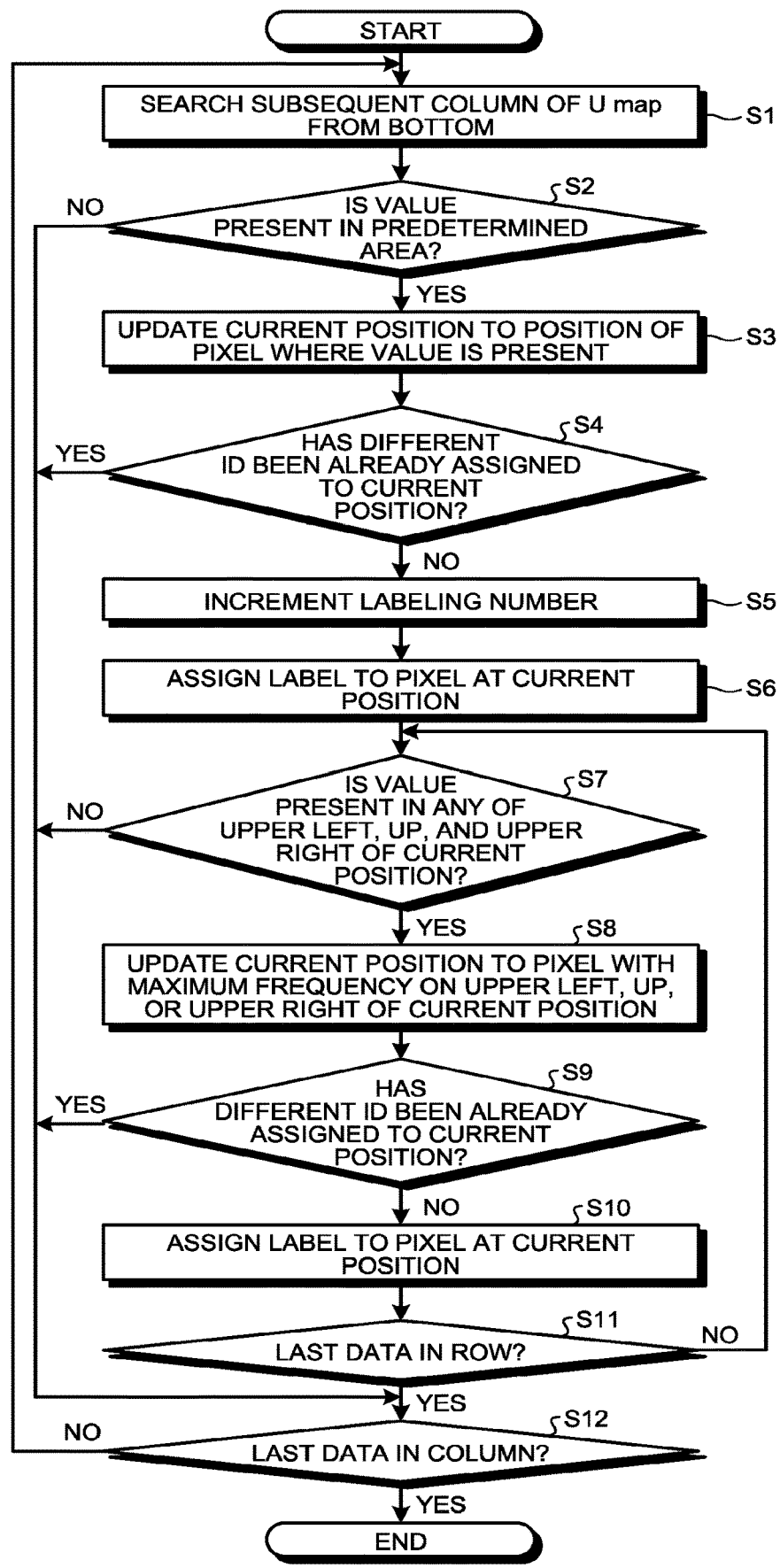
FIG. 9 is a flowchart that illustrates operations during a labeling process.

The flowchart of FIG. 9 illustrates the flow of operations during the turning-wall labeling process by the wall detecting unit 618. First, the wall detecting unit 618 searches the first column of the small U map from the bottom (the shortest distance area) (Step S1). Then, the wall detecting unit 618 determines whether there is a pixel having a frequency value among the above-described three pixels on the row above the currently searched pixel (Step S2). When there is no pixel having a frequency value among the above-described three pixels (Step S2: No), the wall detecting unit 618 proceeds to the operation at Step S12 to determine whether search has been finished for the last data in the last column. When it is determined that search has been finished for the last data in the last column (Step S12: Yes), the wall detecting unit 618 then terminates the process in the flowchart of FIG. 9. Conversely, when it is determined that search has not been finished for the last data on the last column, the wall detecting unit 618 returns to the operation at Step S1 to search the next column. That is, when the wall detecting unit 618 does not detect any pixel having a frequency value among the three pixels on the row above the currently searched pixel, it terminates the current search, the first search during which for example the labeling number "1" is assigned, and proceeds to the second search during which the labeling number "2" is assigned.

Then, when there is a pixel having a frequency value among the above-described three pixels (Step S2: Yes), the wall detecting unit 618 updates the current search position to the position of the pixel having a frequency value (Step S3). Then, the wall detecting unit 618 determines whether a labeling number has been already assigned to the pixel at the current search position (Step S4).

When it is determined that a labeling number has been already assigned, the wall detecting unit 618 terminates the process in the flowchart of FIG. 9 or returns to the operation at Step S1 to search the next column through the above-described Step S12.

Conversely, when it is determined that a labeling number has not been assigned (Step S4: No), the wall detecting unit 618 increments the labeling number by one (Step S5) and conducts a labeling process to assign the incremented labeling number to the pixel at the current search position (Step S6).

Then, the wall detecting unit 618 determines whether there is a pixel having a frequency value among the pixel located above the pixel at the current search position and the pixels on the immediate right and left of the pixel located above, included in pixels on the next row above the pixel (the pixel with the labeling number assigned) at the current search position (Step S7). That is, at Step S7, the wall detecting unit 618 determines whether there is a pixel having a frequency value among the above-described three pixels.

When it is determined that there is no pixel having a frequency value among the above-described three pixels (Step S7: No), the wall detecting unit 618 terminates the process in the flowchart of FIG. 9 or returns to the operation at Step S1 to search the next column through the above-described Step S12.

Conversely, when it is determined that there is a pixel having a frequency value among the above-described three pixels (Step S7: Yes), the wall detecting unit 618 updates the current search position to the position of the pixel with the maximum frequency (Step S8).

Then, the wall detecting unit 618 determines whether a different ID has been already assigned to the pixel at the current search position that has been updated. When it is determined that a different ID has been already assigned (Step S9: Yes), the wall detecting unit 618 terminates the process in the flowchart of FIG. 9 or returns to the operation at Step S1 to search the next column through the above-described Step S12.

Conversely, when it is determined that a different ID has not been assigned yet to the pixel at the current search position that has been updated (Step S9: No), the wall detecting unit 618 assigns a labeling number to the pixel at the current search position (Step S10).

Then, the wall detecting unit 618 determines whether search has been finished for the last data (pixel) in the currently searched row (Step S11). Then, when it is determined that search has not been finished for the last pixel in the current row (Step S11: No), the wall detecting unit 618 returns to the operation at Step S7 to search the next pixel in the current row. Conversely, when it is determined that search has been finished for the last pixel in the current row (Step S11: Yes), the wall detecting unit 618 terminates the process in the flowchart of FIG. 9 or returns to the operation at Step S1 to search the next column through the above-described Step S12.

Figure 10A:
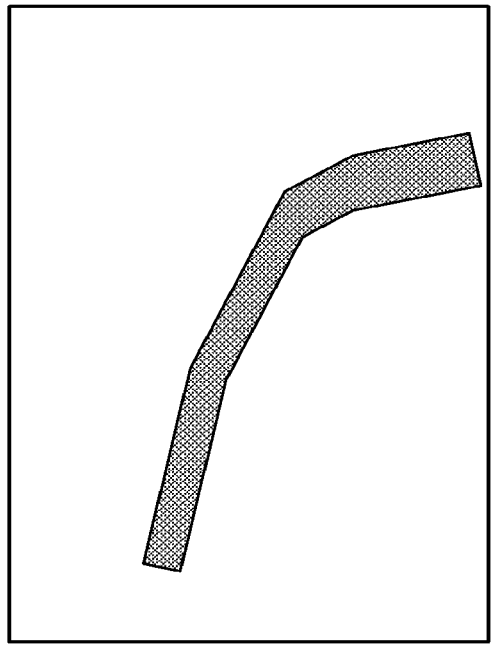
FIGS. 10A and 10B are diagrams that illustrate a small U map that corresponds to a side wall and an image of the side wall on the small U map on which a turning-time wall labeling process has been conducted.
Figure 10B:
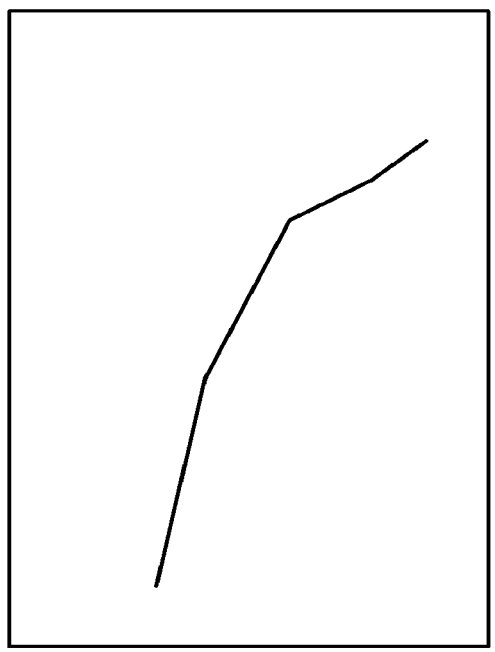

Next, FIG. 10A is a small U map that corresponds to a side wall, and FIG. 10B is an image of a turning-time wall labeling process on the side wall on the small U map. During the turning-time wall labeling process, a labeling process is conducted in a thin line as illustrated in FIG. 10B. This is because, even though the start point of search in each column is shifted by several pixels, a labeling process is conducted on a high-frequency pixel in a cluster of pixels with frequencies (the route of a labeling process is converged into a pixel with a high frequency).

Here, when the wall detecting unit 618 detects a wall, an object-area detecting unit processes an area inside the wall at a subsequent step, whereby the processing speed is improved and a failure such as improper recognition of a wall as an object is prevented.

However, results of the turning-wall labeling process tend to be labeled thinly as compared with a cluster of disparity frequencies on the small U map described above. Therefore, if an area inside the wall is simply processed, there is a possibility of such a failure that the wall is processed as a different object.

Figure 11A:
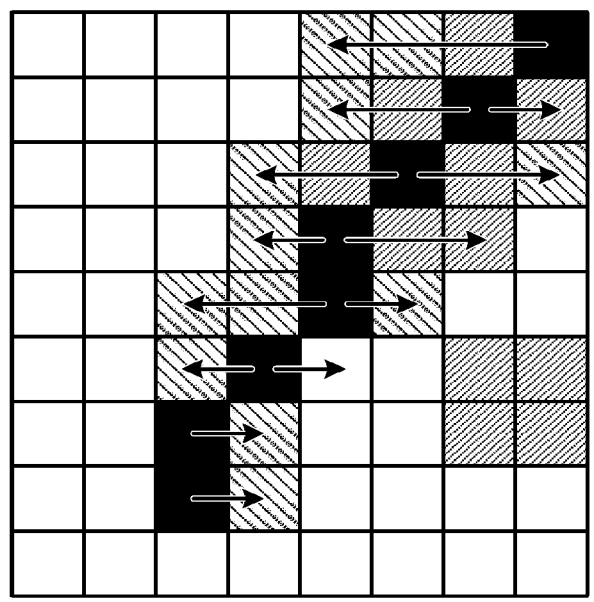
FIGS. 11A and 11B are diagrams that illustrate an expansion applying process of a labeling number.
Figure 11B:
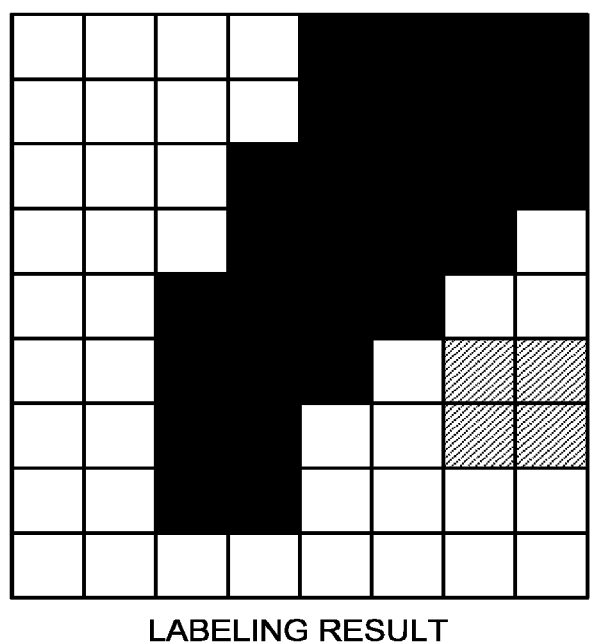

For this reason, the wall detecting unit 618 performs an expansion applying process to apply the identical labeling number to the pixels on the immediate right and left of the pixel on which a labeling process has been conducted, as illustrated in FIG. 11A. During the expansion applying process, a labeling number is applied to "pixels with successive frequency values" on the small U map with respect to each row having a labeling number. Thus, as illustrated in FIG. 11B, a labeling result having a width of for example 2 to 5 pixels may be obtained.

Figure 12A:
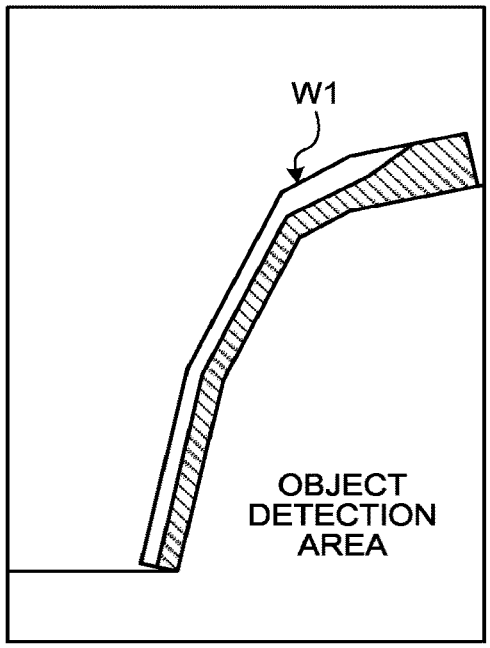
FIGS. 12A and 12B are diagrams that illustrate a detection process of an object when the expansion applying process of a labeling number is not performed and a detection process of an object when the expansion applying process of a labeling number is performed.

The wall detecting unit 618 determines a detection processing area (recognition processing area) of an object on the basis of pixels located on the innermost side of expansion. Specifically, FIG. 12A illustrates a detection processing area of an object when the above-described expansion applying process of a labeling number is not performed. In FIG. 12A, although the wall W1 has a width, a labeling process is conducted in a thin straight line passing through substantially the center of the wall W1. Therefore, there is a possibility that the inner area of the wall indicated by the diagonal line in FIG. 12A is recognized as a different object during an object detection process.

Figure 12B:
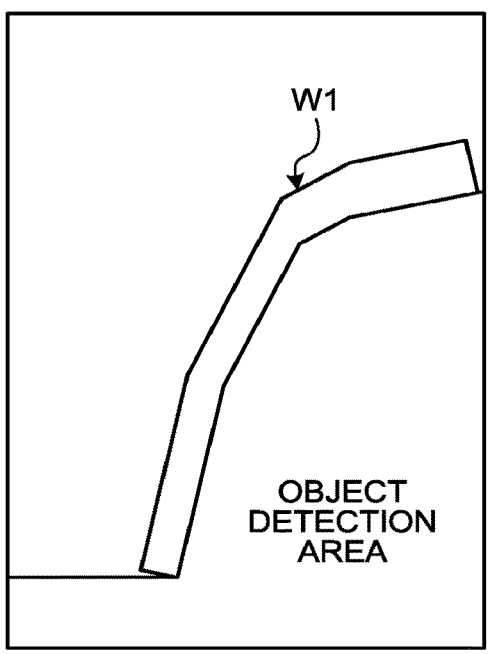

However, by performing the above-described expansion applying process of a labeling number, a labeling process may be conducted on the wall W1 having a corresponding width, as illustrated in FIG. 12B. Thus, as illustrated in FIG. 12B, the object-area detecting unit at a subsequent step is capable of performing a recognition process (detection process) on an object by separating the wall W1 and other objects with accuracy even though the detection range of objects is set along the inner side of the wall.

Furthermore, in this example, an expansion applying process is performed to assign the identical labeling number to pixels on the immediate right and left of the pixel that has undergone a labeling process. However, an expansion applying process of a labeling number may be performed on any one of pixels on the immediate right and left of the pixel that has undergone a labeling process.

Then, when searching the small U map during the turning-wall labeling process, the wall detecting unit 618 sequentially searches it from the extreme left column of the small U map as illustrated in FIG. 7B. Walls are often located on the outer side of small U maps. Therefore, by sequentially searching a small U map from the extreme left column, a labeling process is first conducted on a wall, and then a labeling process is conducted on a different object such as a leading vehicle. Thus, the labeling number of a wall and the labeling number of a different object such as a leading vehicle may be different labeling numbers, and a wall and a different object such as a leading vehicle may be separately detected with accuracy.

Here, the example of FIG. 7B illustrates the search conducted to perform the first labeling process on the column of the pixel P1; however, in actuality, search is started from the extreme left column of the small U map. In the example of FIG. 7B, however, there are no pixels having a frequency value on the extreme left column and the adjacent second column of the small U map. When no pixels having a frequency value are detected within a predetermined range, search for a labeling process on the column is cancelled, and a transition is made to search in the next column. The search number "1" illustrated in the example of FIG. 7B indicates the search during which the pixel P1 having a frequency value is initially detected.

Figure 13A:
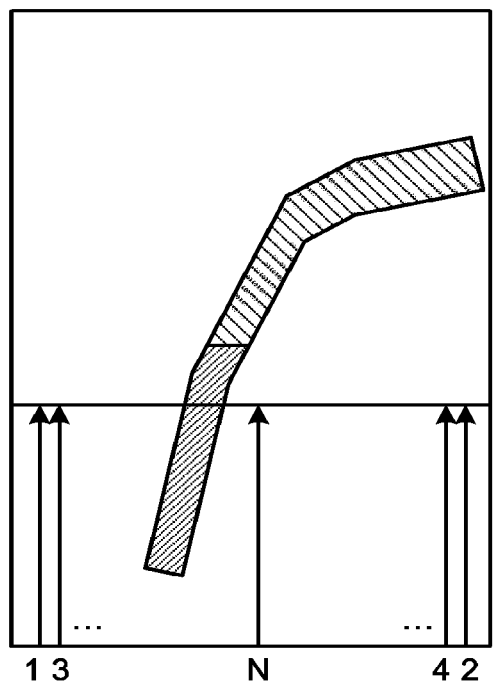
FIGS. 13A and 13B are diagrams that illustrate the order of search on the small U map for a labeling process.

Next, the wall detecting unit 618 may search a small U map and perform a labeling process as described below. Specifically, in the example illustrated in FIG. 13A, the wall detecting unit 618 searches the extreme left column of the small U map in the first time and searches the extreme right column of the small U map in the second time. Furthermore, in the example illustrated in FIG. 13A, the wall detecting unit 618 searches the second column from the extreme left of the small U map in the third time and searches the second column from the extreme right of the small U map in the fourth time. That is, in the example of FIG. 13A, the wall detecting unit 618 alternately conducts search on the right and left and sequentially shifts the column to be searched to the inner side while conducting search.

Figure 13B:
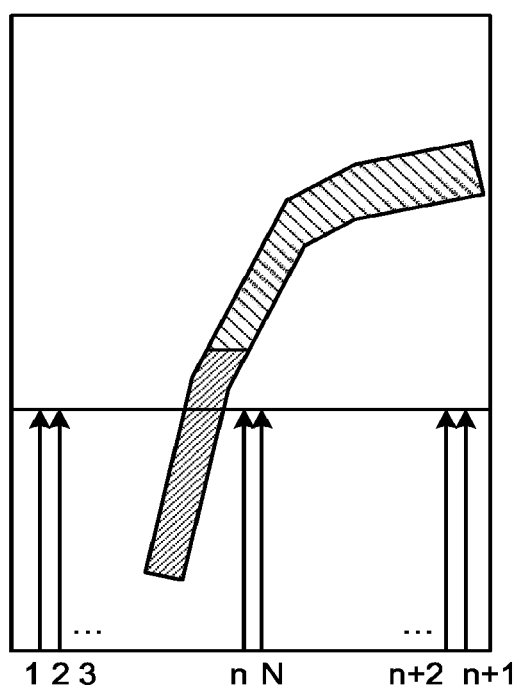

Alternatively, as illustrated in FIG. 13B, the wall detecting unit 618 may sequentially conduct search from the extreme left column until a column N in the middle, and when search on the column N is finished, shift the column to be searched to the extreme right and sequentially conduct search from the extreme right until the column N.

As described above, when there is a wall in a captured image, the wall is often located as an object on the outermost side among all the objects. Furthermore, the wall detecting unit 618 conducts search from the extreme left of a small U map during a turning-wall labeling process so that the wall and other objects are easily detected in a separate way due to a process to merge labeling numbers as described later. This allows a labeling process to be performed on a wall before other objects among objects on a small U map. Thus, a wall and other objects may be easily detected in a separate manner.

Next, an explanation is given of a process to merge labeling numbers. The process to merge labeling numbers is a process to, when the trajectory of a labeling number during a labeling process is identical to the trajectory of a pixel on which a labeling process is previously conducted, assign an identical labeling number (merge labeling numbers) to them. Specifically, the wall detecting unit 618 performs a process to merge labeling numbers when the trajectory of a labeling number during a labeling process is identical to the trajectory of a pixel on which a labeling process is previously conducted and when the number of pixels in the interval between the pixel on which a labeling process is currently conducted and the pixel on which a labeling process is previously conducted is less than a predetermined pixel number.

Figure 14A:
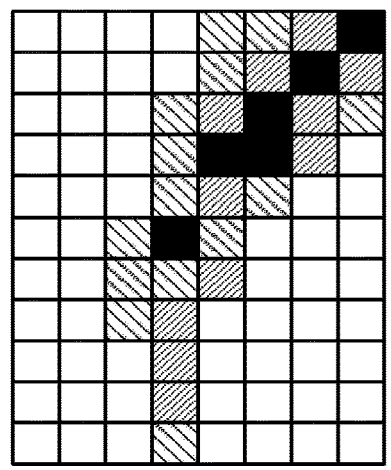
FIGS. 14A, 14B, and 14C are diagrams that illustrate a process to merge labeling numbers.
Figure 14B:
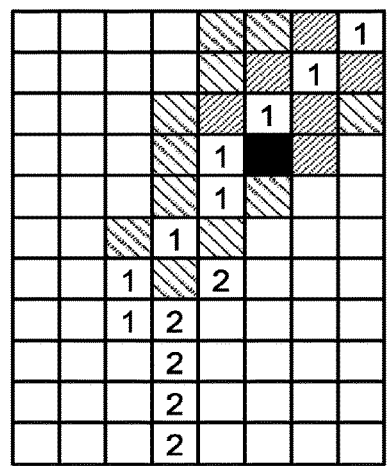

FIG. 14A illustrates a small U map on which a wall has been voted, and FIG. 14B illustrates a small U map on which the first labeling process has been finished and the second labeling process is currently performed. In FIG. 14B, the pixel with the number "1" assigned represents the pixel that has been labeled during the first labeling process, and in FIG. 14B, the pixel with the number "2" assigned represents the pixel that has been labeled during the second labeling process.

As indicated by a circle in FIG. 14B, it is assumed that the trajectory of the second-time labeling number during the labeling process currently conducted is identical to the trajectory of a pixel that has undergone the first labeling process. In this case, the entire length of the wall represented by the pixels that have undergone the first labeling process becomes shorter and there is a possibility that it is not detected as a wall. Furthermore, even if the object represented by pixels that have undergone the first labeling process is detected as a wall, the pixels (disparity) that are present in front of the pixels that have undergone the first labeling process and that have been labeled with "2" are pixels targeted for detection, and they are detected as some object.

Figure 14C:
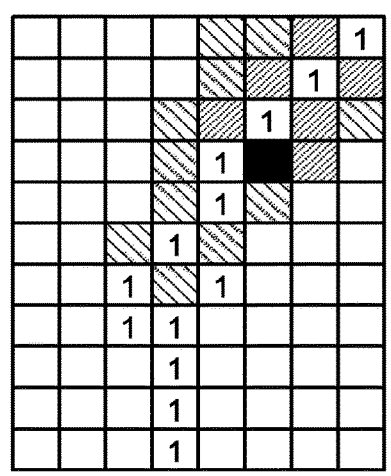

Therefore, when the trajectory of the second-time labeling number is identical to the trajectory of a pixel that has undergone the first labeling process and when there is a gap equal to or less than for example two pixels between the pixel with "1" and the pixel labelled with "2", the wall detecting unit 618 performs a process to label the pixel labelled with "2" as the pixel with "1" (process to merge labeling numbers). Specifically, in the example of FIG. 14B, there is a gap G of one pixel between the pixel labelled with "2" and the pixel with "1" above. Thus, as illustrated in FIG. 14C, the wall detecting unit 618 performs a process to label all the pixels with "2" as pixels with "1". In other words, the wall detecting unit 618 combines the pixels with "1" and "2" to merge the trajectory of the pixels with "2" into the trajectory of the pixels with "1".

Furthermore, the above process to merge labeling numbers may be performed when there are other than two pixels, such as one pixel or equal to or less than three pixels, in the gap between them. Moreover, a merge process may be performed in accordance with a distance, for example, the distance in the gap between them is equal to or less than one meter.

By performing the above process to merge labeling numbers, pixels that correspond to the entire length of an object extending in a depth direction of a small U map may be labelled with the identical labeling number. Thus, the entire length of an object extending in a depth direction of a small U map may be represented with accuracy, and a detection rate and a detection accuracy of walls may be improved.

Figure 15A:
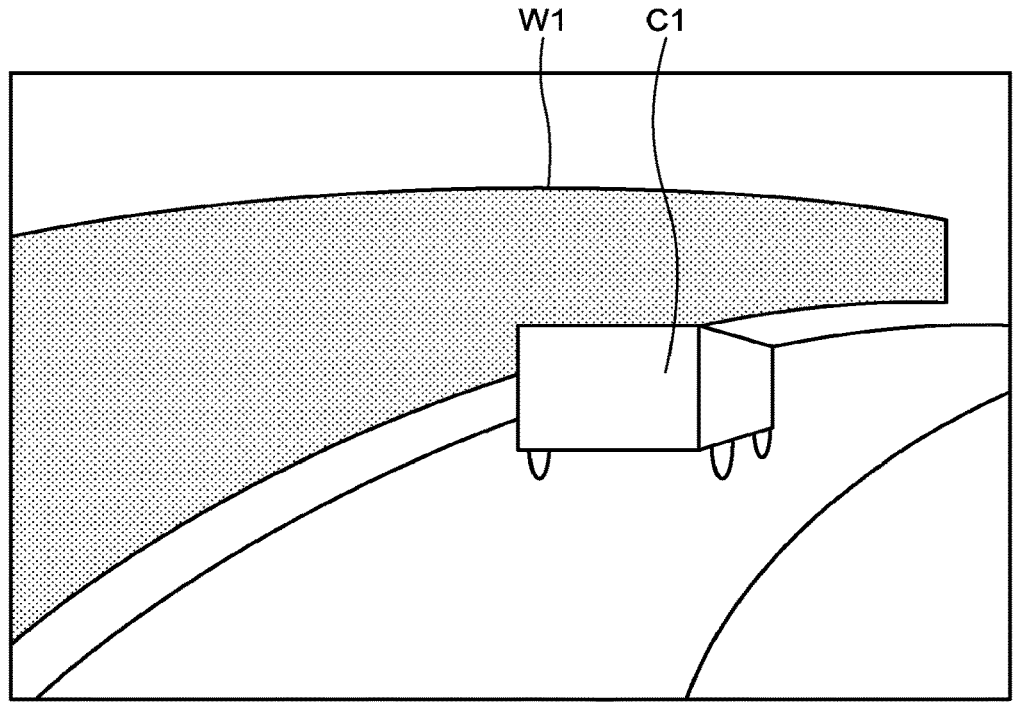
FIGS. 15A and 15B are diagrams that illustrate a captured image (luminance image) where the wall and the leading vehicle are overlapped and the corresponding small U map.
Figure 15B:
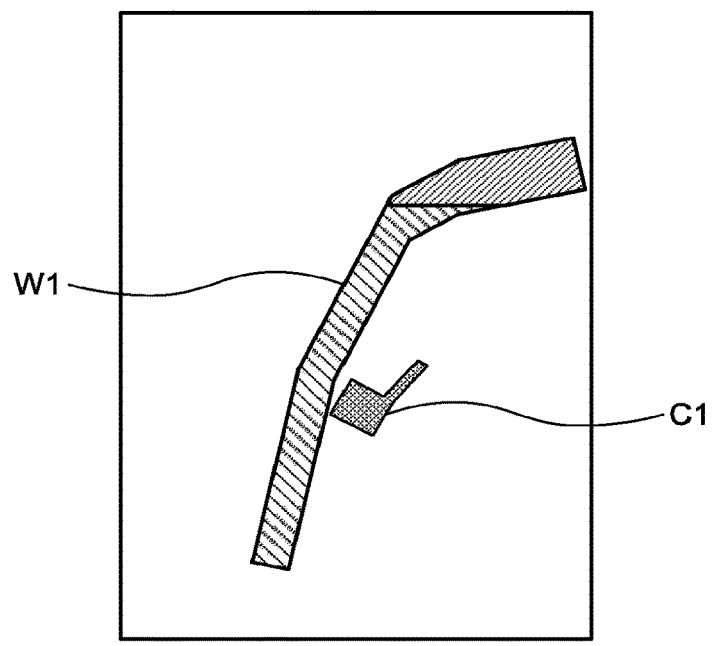

Furthermore, by performing the above process to merge labeling numbers, objects overlapped on a small U map are detectable in a separate manner. For example, as illustrated in FIG. 15A, when the leading vehicle C1 and the wall provided along the road that is curved to the right are overlapped in the captured image obtained, the small U map is obtained as in FIG. 15B. Although the wall W1 and the leading vehicle C1 are physically apart from each other, disparity of the wall W1 and disparity of the leading vehicle C1 are connected due to disparity variance. However, there is a distance between the leading vehicle C1 that is moving and the wall W1, and although they are adjacent to each other on the small U map, there is likely to be a gap between the pixels of the wall W1 on which a labeling process has been performed and the pixels of the leading vehicle C1.

Figure 16A:
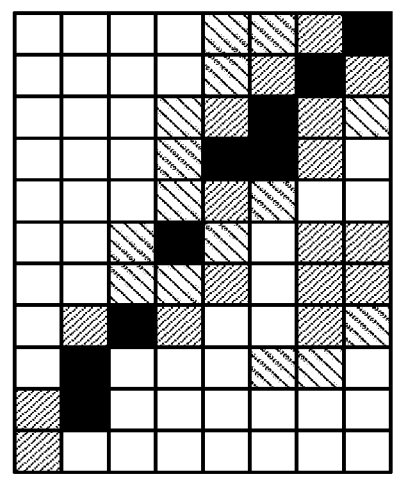
FIGS. 16A, 16B, and 16C are diagrams that illustrate a state where each object on the small U map may be separated and easily detected during the process to merge labeling numbers.
Figure 16B:
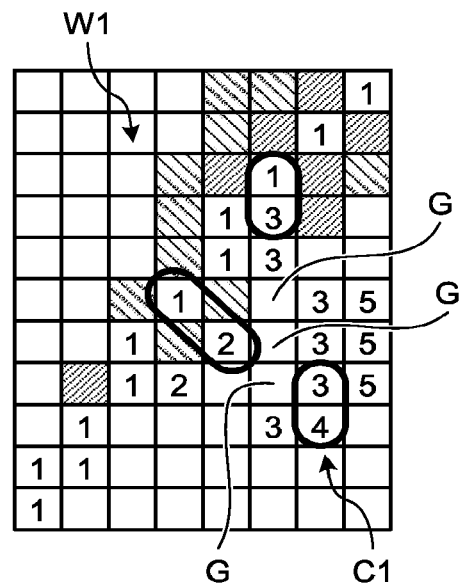

Specifically, FIG. 16A is a small U map of part of the wall W1 and the leading vehicle C1, and FIG. 16B illustrates each pixel of the small U map, attached with a labeling number during the above-described labeling process. There is only the gap G of one pixel, equal to or less than two pixels, between the pixel with the labeling number "1" and the pixel with "2" under the same condition as that described above. Therefore, the pixel with "2" is merged into the pixel with "1".

Figure 16C:

Conversely, in FIG. 16B, there is the gap G of three pixels between the pixel with "3" that corresponds to the leading vehicle C1 and the pixel with "1" that corresponds to the wall W1 contrary to the above-described condition of equal to or less than two pixels. In this case, the wall detecting unit 618 does not perform the merge process on the pixel with "3" that corresponds to the leading vehicle C1 and the pixel with "1" that corresponds to the wall W1 as illustrated in FIG. 16C. Thus, even though the wall W1 and the leading vehicle C1 are overlapped on a small U map, they may be attached with different labeling numbers during a labeling process. Thus, even though the wall W1 and the leading vehicle C1 are overlapped on the small U map, they may be accurately detected in a separate manner on the basis of different labeling numbers.

Advantage of the First Embodiment

As it is understood from the above explanation, the device control system according to the first embodiment searches for pixels that have a frequency value and that stretch from the shortest distance area (front side) to the long distance area (back side) on a low-resolution U map (small U map) generated from a disparity image. Then, a labeling process is repeatedly performed on a pixel having the highest frequency as a pixel that stretches in a depth direction among three pixels in total, i.e., the pixel on the next row immediately above the pixel having a frequency value, detected during this search, and the pixels on the immediate right and left of the pixel (turning-wall labeling process).

While searching for pixels that stretch in a depth direction, the above-described three pixels on the row above are candidates to be selected, whereby a labeling process may be conducted in accordance with the shape of an object that is curved as it moves in a depth direction. This allows curved walls to be detected with accuracy. Furthermore, when the range of this search is limited to, for example, within an intermediate distance area, objects (walls) are detectable at high speed.

Furthermore, by using small U maps that are low-resolution U maps, the effect of disparity variance may be reduced, and curved walls may be detected by using a technique similar to a labeling process of image processing. Furthermore, as the size of images to be processed is small, high-speed processing is possible. Furthermore, when a wall is detected, the pixels of the wall are given with a width, and an area inside the wall is determined. Furthermore, for object detection by the object-area detecting unit at a subsequent step, a detection process is performed on an object on the basis of an inner area of a wall, whereby reduction of false detection and high-speed processing are possible.

Furthermore, the device control system according to the first embodiment searches a small U map from the extreme left during a turning-wall labeling process. Thus, a labeling process may be conducted on a wall before other objects included in objects on a small U map. Thus, a wall and other objects may be easily detected in a separate manner.

Figure 17A:
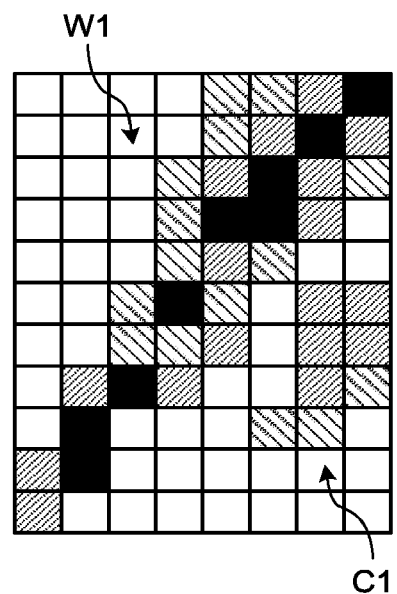
FIGS. 17A and 17B are diagrams that illustrate a problem such that, when a labeling process is conducted by searching the small U map from the extreme right, the identical labeling number is assigned to the wall and the leading vehicle.
Figure 17B:
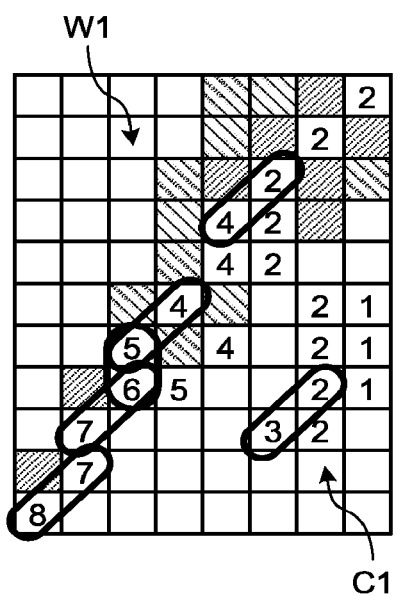

A detailed explanation is given of the reason why it is possible to produce an advantage that a wall and other objects may be easily detected in a separate way by conducting search from an outer side in the above manner. FIG. 17A is a small U map that corresponds to a captured image in a state where the leading vehicle C1 is overlapped with the wall W1 as illustrated in FIG. 16A. Furthermore, FIG. 17B is a diagram that illustrates a small U map on which the above-described labeling process is conducted by searching the small U map from the extreme right. When there is a wall in a captured image, the wall is often located as an object on the outermost side among all the objects. However, when search is conducted from the extreme right of the small U map, a labeling process is performed on the leading vehicle C1 located on the inner side of the wall W1 prior to the wall W1.

Therefore, as illustrated in FIG. 17B, there is a problem in that the identical labeling number "2" is applied to the leading vehicle C1 and then the wall W1 during for example the second search. Then, the identical labeling number assigned to the wall W1 and the leading vehicle C1 in this way (the identical labeling number assigned to different objects) is continuously the identical labeling number regardless of whether there is the above-described process to merge labeling numbers due to a subsequent search.

Figure 18A:
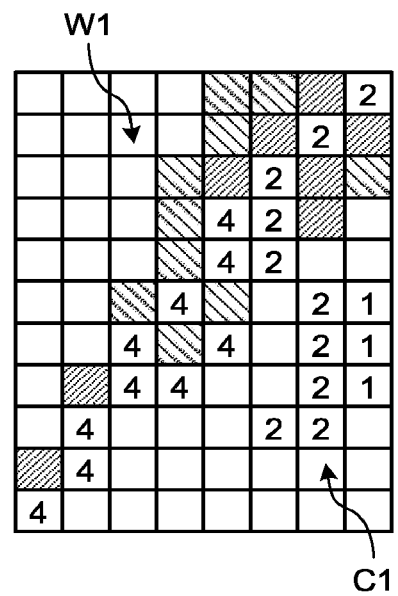
FIGS. 18A and 18B are diagrams that illustrate a problem such that, regardless of whether there is a process to merge labeling numbers, the identical labeling number assigned to the wall and the leading vehicle are not changed.

Specifically, FIG. 18A is an example of the case where the trajectory of the pixels with the labeling number "4" on which a labeling process has been conducted during the fourth search is not overlapped with the trajectory of the pixels with the above-described labeling number "2". In this case, as it is understood from FIG. 18A, the pixels with the labeling number "2" continuously remain regardless of whether there is a process to merge the pixels with the labeling number "4".

Figure 18B:
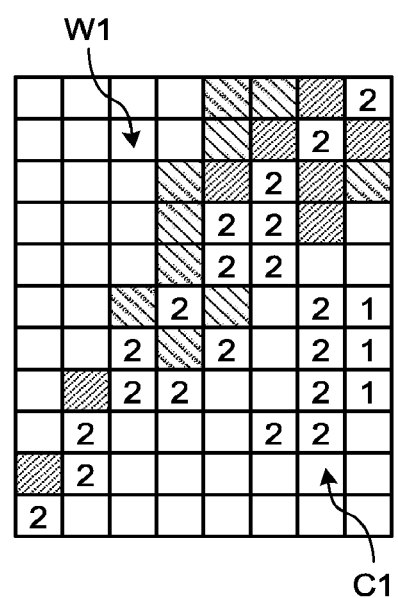

Furthermore, FIG. 18B is an example of the case where the trajectory of the pixels with the labeling number "4" on which a labeling process has been conducted during the fourth search is overlapped with the trajectory of the pixels with the above-described labeling number "2". In this case, as it is understood from FIG. 18B, the pixels with the labeling number "4" are merged into the pixels with the labeling number "2". Then, in this case, too, the pixels attached with the labeling number "2" before the merge process continuously remain.

As described above, when the identical labeling number is assigned to the wall W1 and the leading vehicle C1, the pixels with the identical labeling number continuously remain regardless of whether there is a merge process, and therefore it is difficult to detect them in a separate manner.

However, according to the first embodiment, as search is conducted from the extreme left of a small U map, it is possible that a labeling process is performed starting from the wall W1, as explained with reference to FIG. 7B, FIG. 17, and the like, and a labeling process is performed on the leading vehicle C1 during the subsequent search. Thus, different labeling numbers may be assigned to the wall W1 and other objects (the leading vehicle C1) so that they are easily detected in a separate manner.

Second Embodiment

Next, a device control system according to a second embodiment is explained. According to the above-described first embodiment, during a turning-wall labeling process, when the three pixels on the row above the currently searched pixel do not include any pixel having a frequency value, the search during which the current labeling number is assigned is cancelled, and a transition is made to the search during which the subsequent labeling number is assigned.

Conversely, with the device control system according to the second embodiment, the current search is continued in accordance with a distance or a number of pixels such that the search during which the current labeling number is assigned is continued when three pixels on the second row above the currently searched pixel include a pixel having a frequency value even though the three pixels on the row above the currently searched pixel do not include any pixel having a frequency value. Specifically, when the number of pixels that have no frequency value and that are present in the gap between a pixel on which a labeling process has been conducted and the next pixel on which a labeling process is conducted is more than a predetermined number of pixels, the search is terminated and a transition is made to the subsequent search, and when the number of pixels having a frequency value is less than the predetermined number of pixels, the search is continued and a labeling process is conducted. The above-described first embodiment and the second embodiment described below are different in this aspect. Therefore, only the difference between them is explained, and duplex explanations are omitted.

Figure 19:
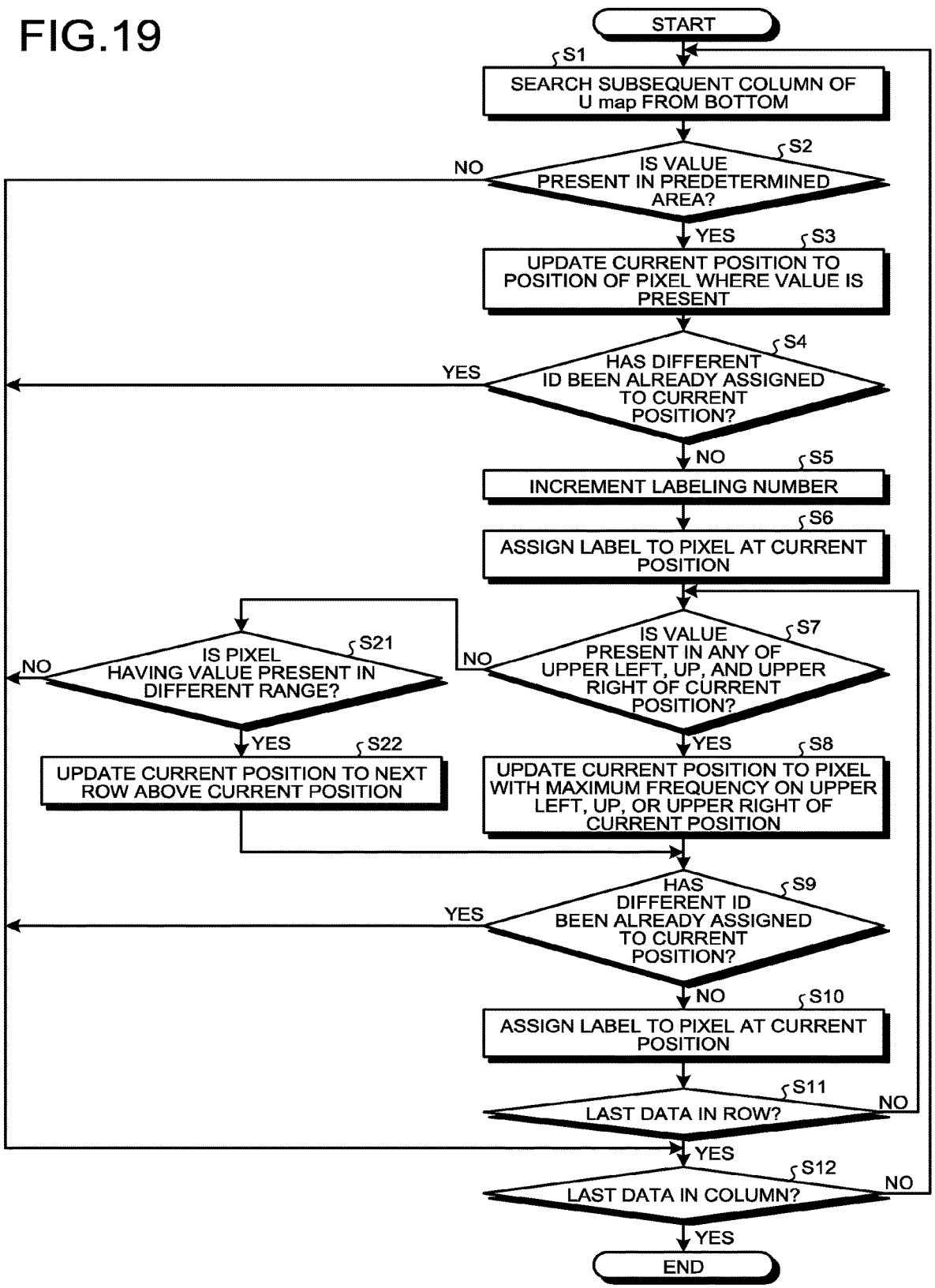
FIG. 19 is a flowchart that illustrates a process of the device control system according to a second embodiment to skip a pixel having no frequency value and continue a labeling process with the identical labeling number.

The flowchart of FIG. 19 illustrates the flow of a turning-wall labeling process according to the second embodiment. The flowchart of FIG. 19 is different from the flowchart that illustrates the flow of the turning-wall labeling process according to the first embodiment illustrated in FIG. 9 in performing operations at Step S21 and Step S22. Here, each operation at Step S1 to Step S12 in the flowchart of FIG. 19 has the same details as a corresponding operation at Step S1 to Step S12 in the flowchart of FIG. 9. The above explanation of the flowchart in FIG. 9 needs to be referred to for detailed explanations.

Figure 20A:
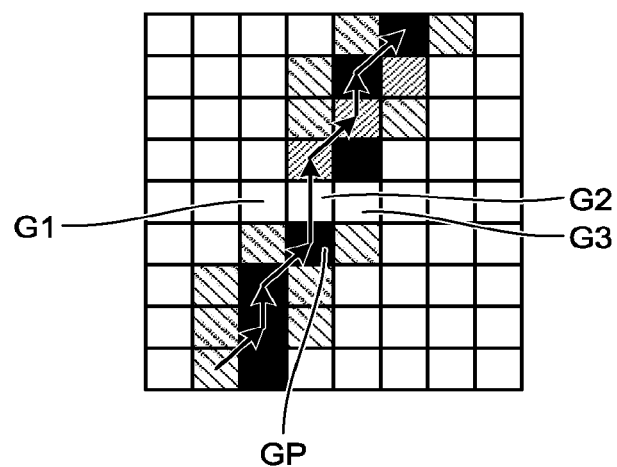
FIGS. 20A and 20B are diagrams that illustrate a process of the device control system according to the second embodiment to skip a pixel having no frequency value and continue a labeling process with the identical labeling number.

According to the second embodiment, at Step S7 in the flowchart of FIG. 19, when the wall detecting unit 618 determines that the above-described three pixels on the next row above the currently searched pixel do not include any pixel having a frequency value (Step S7: No), the process proceeds to Step S21. Specifically, as illustrated in FIG. 20(a), three pixels G1 to G3 on the next row above the currently searched pixel GP do not include any pixel having a frequency value. In this case, according to the first embodiment, the search during which the current labeling number is assigned is terminated, and a transition is made to search during which the subsequent labeling number is assigned. Conversely, according to the second embodiment, the process proceeds to Step S21, and the search during which the current labeling number is assigned is continued.

At Step S21, the wall detecting unit 618 determines whether a pixel having a frequency value is present in a different range. That is, for instance, the wall detecting unit 618 determines whether three pixels on for example the second row above the currently searched pixel include a pixel having a frequency value. Here, the range of search may be optionally set due to design, or the like, such that it is determined whether five pixels on the third row above include a pixel having a frequency value.

When it is determined that a pixel having a frequency value is not present in the different range (Step S21: No), the wall detecting unit 618 returns to the operation at Step S1 through S12 so as to transition to the search during which the subsequent labeling number is assigned.

Conversely, when it is determined that a pixel having a frequency value is present in the different range (Step S21: Yes), the wall detecting unit 618 updates the position of a pixel having a frequency value on the next row above the currently searched pixel as the position of the currently searched pixel at Step S22 and proceeds to the operation at Step S9.

Figure 20B:
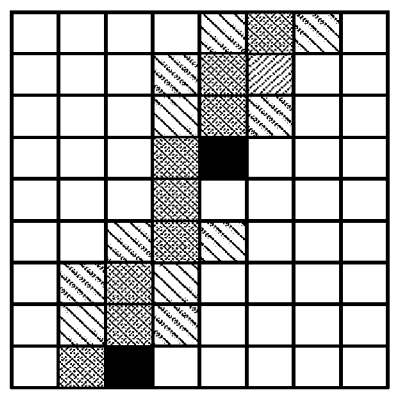

Thus, as illustrated in FIG. 20A, even when three pixels on the next row above the currently searched pixel GP do not include any pixel having a frequency value, it is possible that a pixel having a frequency value is detected from three pixels on the second row above the currently searched pixel GP and a labeling process that corresponds to the current search is continued as illustrated in FIG. 20B, and also the same advantage as that in the above-described first embodiment may be obtained.

Furthermore, in the example of FIG. 20A, the labeling number that corresponds to the current search is applied to the pixel G2 that is adjacent to and above the currently searched pixel GP. However, a labeling number may be assigned to the pixel G1 or the pixel G3. Furthermore, it is possible that, when a pixel having a frequency value is not present on the next row above the current pixel GP, a pixel having no frequency value is skipped and a labeling number is continuously assigned to a pixel having a frequency value on the second row above the current pixel GP. That is, the current labeling number may or may not be assigned to a pixel having no frequency value.

Third Embodiment

Next, a device control system according to a third embodiment is explained. The device control system according to the third embodiment separately uses a technique of detecting stretching objects that are curved as they move to the back side of a small U map and a technique of detecting objects that stretch linearly in a back direction of a small U map, whereby there is an improvement in the accuracy with which stretching objects are detected. Here, each of the above-described embodiments and the third embodiment described below are different in only this aspect. Therefore, only the difference is explained below, and duplex explanations are omitted.

Figure 21A:
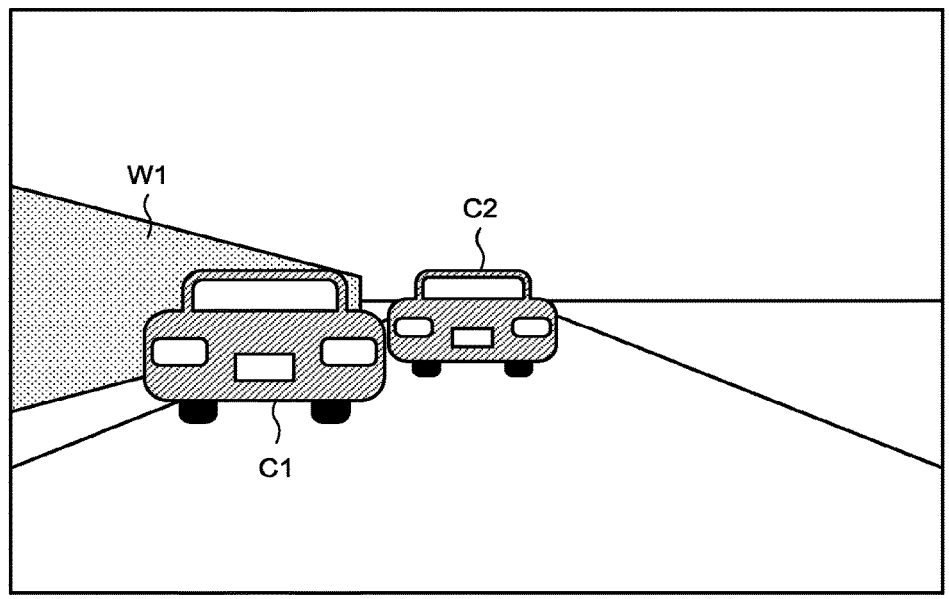
FIGS. 21A, 21B, and 21C are diagrams that illustrate a problem such that, when the linear wall and the two leading vehicles are overlapped on the small U map, the identical labeling number is assigned to the linear wall and the two leading vehicles and therefore the two leading vehicles are detected as part of the wall.
Figure 21B:
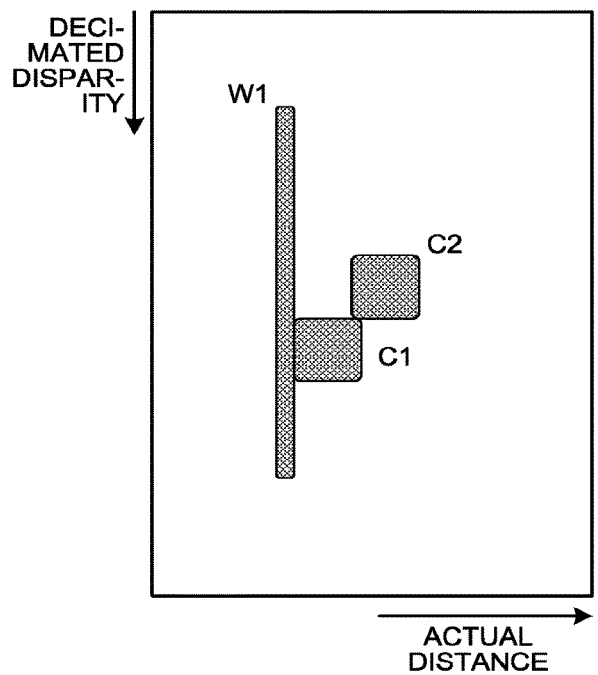
Figure 21C:
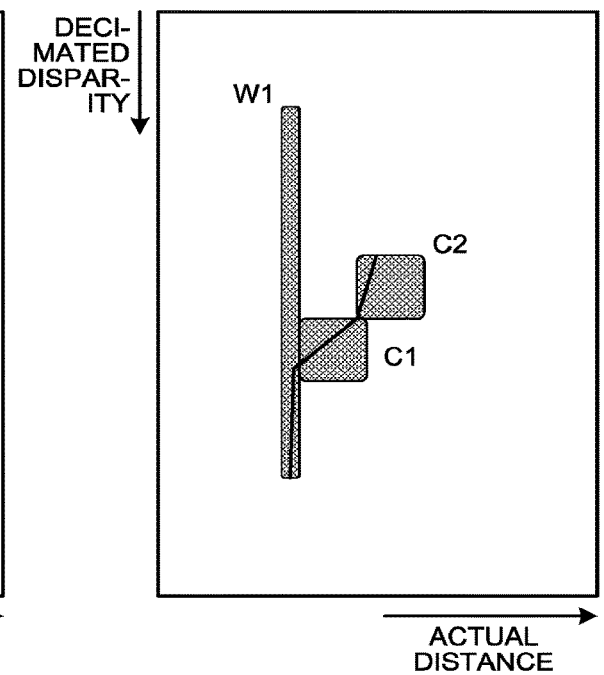

For example, as illustrated in the captured image (luminance image) of FIG. 21A, when two leading vehicles C1, C2 running near the wall W1 are in a short distance, the wall W1, the leading vehicle C1, and the leading vehicle C2 are sometimes connected on the small U map, as illustrated in FIG. 21B. In this case, when the above-described turning-wall labeling process is conducted, the identical labeling number is assigned to the wall W1, the leading vehicle C1, and the leading vehicle C2 during the labeling process conducted in accordance with the disparity frequency of each pixel, as illustrated in FIG. 21C. Then, there is a slight possibility that the leading vehicle C1 and the leading vehicle C2 are mistakenly detected as the curved wall W1.

Figure 22:
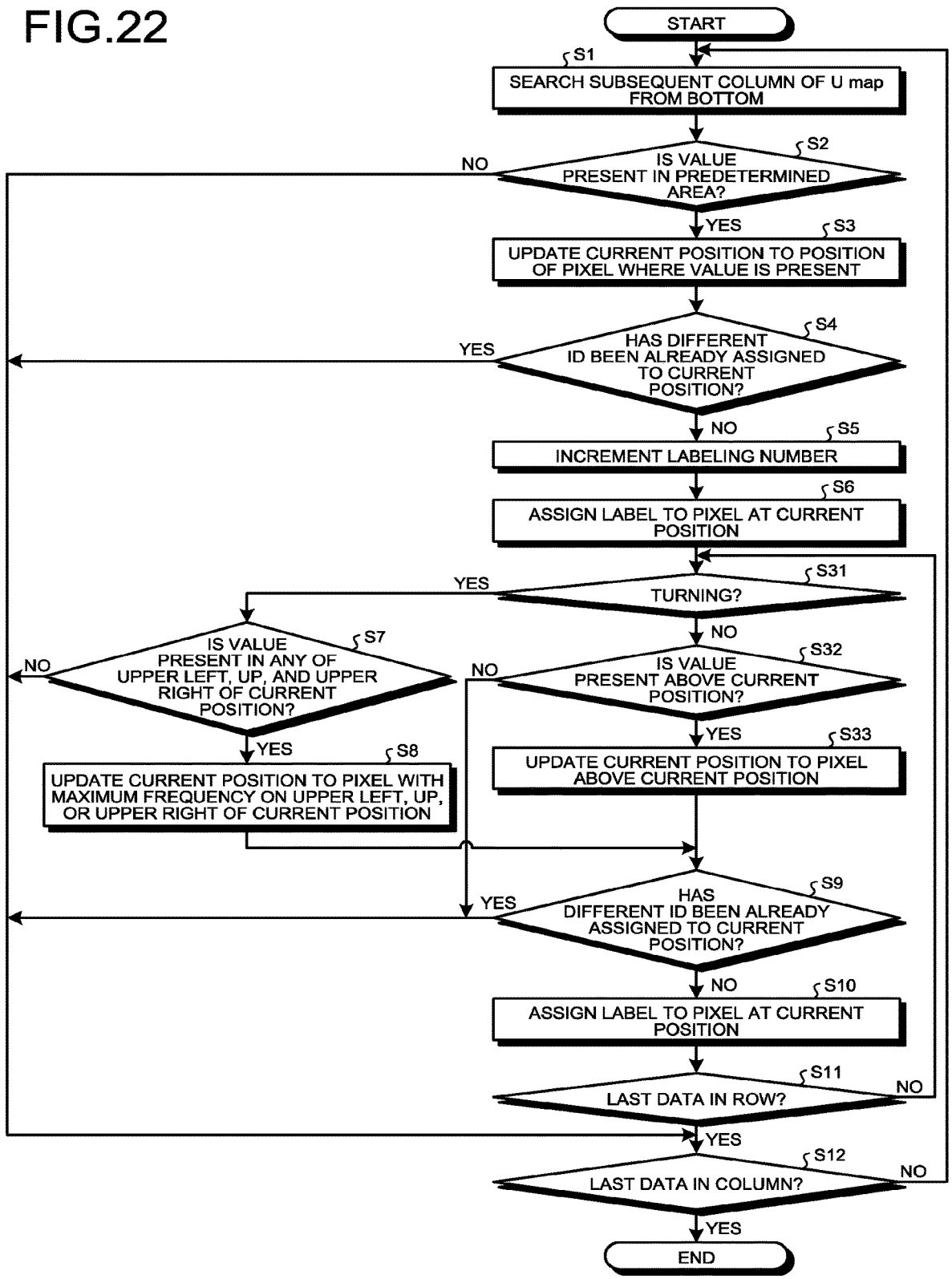
FIG. 22 is a flowchart that illustrates a process of a device control system according to a third embodiment selectively using a labeling process for linear walls and a labeling process for turning walls depending on whether the vehicle is turning.

For this reason, the device control system according to the third embodiment selectively uses a labeling process for linear walls and a labeling process (the above-described turning-wall labeling process) for curved walls. The flowchart of FIG. 22 illustrates the flow of a labeling process including the operation to select a labeling process. In the flowchart of FIG. 22, each operation at Step S31 to Step S33 is performed together with each operation at the above-described Step S7 and Step S8 in the interval between Step S6 and Step S9 that are explained by using the flowchart of FIG. 9. Here, in the flowchart of FIG. 22, each operation at Step S1 to Step S12 has the same details as a corresponding operation at Step S1 to Step S12 in the flowchart of FIG. 9. The above explanation of the flowchart in FIG. 9 needs to be referred to for detailed explanations.

According to the third embodiment, at Step S6 in the flowchart of FIG. 22, after a labeling number that corresponds to the current search is assigned to the pixel at the present location, the process proceeds to Step S31. At Step S31, the wall detecting unit 618 determines whether the vehicle is turning at present on the basis of vehicle information.

Specifically, the wall detecting unit 618 acquires vehicle information such as driving speed, yaw rate (angular velocity), steering angle, or radius of rotation, which are examples of turning information, on the vehicle, and determines whether the vehicle is turning. For example, when the yaw rate exceeds "1", the wall detecting unit 618 determines that the vehicle is turning. Furthermore, when the driving speed of the vehicle is equal to or more than 40 km/h and the steering angle is equal to or more than 10 degrees, the wall detecting unit 618 determines that the vehicle is turning. Here, when it is determined whether there is a turn on the basis of only vehicle information that is a steering angle, there is a problem in that when the steering wheel is turned while the vehicle is being stopped, it is determined that it is turning. For this reason, when it is determined whether there is a turn on the basis of the steering angle, the wall detecting unit 618 refers to the driving speed to determine whether there is a turn. Here, the wall detecting unit 618 may determine whether the vehicle is turning by acquiring one of the pieces of vehicle information described (including vehicle information other than the ones described) or may determine whether the vehicle is turning by acquiring multiple pieces of them.

At Step S31, when it is determined that it is turning (Step S31: Yes), the wall detecting unit 618 proceeds to the operation at Step S7 to conduct the above-described turning-wall labeling process that is a detection technique for curved walls. Then, a labeling process is conducted by selecting a pixel having a frequency value from three pixels in total, i.e., the pixel above the currently searched pixel and the pixels on the immediate right and left of the pixel above. Thus, a labeling process may be conducted on the turning direction of the turned wall, selected from the above-described three pixels, and a labeling process is enabled along the turning direction of the wall.

Conversely, at Step S31, when it is determined that it is not turning (Step S31: No), the wall detecting unit 618 proceeds to the operation at Step S32 to use the detection technique for linear walls. At Step S32, the wall detecting unit 618 determines whether the pixel (the pixel on the row above the current pixel) immediately above the currently searched pixel is a pixel having a frequency value. When it is determined that the pixel immediately above does not have any frequency value (Step S32: No), the wall detecting unit 618 terminates the process in the flowchart of FIG. 22 or returns to the operation at Step S1 to search the next column through the above-described Step S12.

Conversely, when it is determined that the pixel immediately above is a pixel having a frequency value (Step S32: Yes), the wall detecting unit 618 proceeds to the operation at Step S33. At Step S33, the wall detecting unit 618 updates the position of the pixel immediately above as the position of the pixel on which search is currently conducted for a labeling process and then proceeds to the operation at Step S9. Then, when a labeling number is not assigned to the pixel at the position updated at Step S33, the wall detecting unit 618 applies the labeling number that corresponds to the current search (Step S10) and proceeds to the operation at Step S11. Thus, when pixels having a frequency value extend in an upper direction, the identical labeling number is successively applied in a linear fashion. This allows the object-area detecting unit at a subsequent step to easily detect a wall that is linearly arranged.

Furthermore, when the pixel immediately above the currently searched pixel (the pixel on the next row above) does not have a frequency value, it is possible that search of a pixel having no frequency value is skipped and it is determined whether another pixel immediately above (the pixel on the second row above) has a frequency value, as described in the second embodiment.

That is, according to the third embodiment, when the vehicle is turning, the wall detecting unit 618 conducts the turning-wall labeling process that is an example of a first labeling process and, in consideration of the turning direction of the wall, conducts a labeling process by selecting the pixel that corresponds to the turning direction of the wall from the above-described three pixels in total on the top, right, and left. Furthermore, when the vehicle is not turning (when it is moving in a straight line), the wall detecting unit 618 conducts the labeling process for linear walls (an example of a second labeling process) to assign a labeling number that corresponds to the current search in an upper direction of the currently searched pixel. Thus, the identical labeling number is assignable to each of the pixels that constitute a straight wall.

As described above, the device control system according to the third embodiment selectively uses the labeling process for linear walls and the labeling process for curved walls (the above-described turning-wall labeling process). Thus, even when the straight wall W1 and the two leading vehicles C1, C2 are overlapped on the small U map, the identical labeling number is assignable to the pixels of the straight wall W1, as illustrated in FIG. 24B. Thus, the straight wall W1 and the two leading vehicles C1, C2 are detectable with accuracy in a separate manner, and the same advantage as that in each of the above-described embodiments may be obtained.

Fourth Embodiment

Next, a device control system according to a fourth embodiment is explained. According to the fourth embodiment, when the vehicle is moving in a straight line, a labeling process for linear walls is conducted in the range from the shortest distance to the intermediate distance, and the above-described turning-wall labeling process, which is a labeling process with high flexibility, is conducted from the intermediate distance to the long distance. This enables a labeling process that assigns the identical labeling number by following the shape of a wall that is straight and is curved in a long distance. Here, each of the above-described embodiments and the fourth embodiment described below are different in only this aspect. Therefore, only the difference is explained below, and duplex explanations are omitted.

Figure 23:
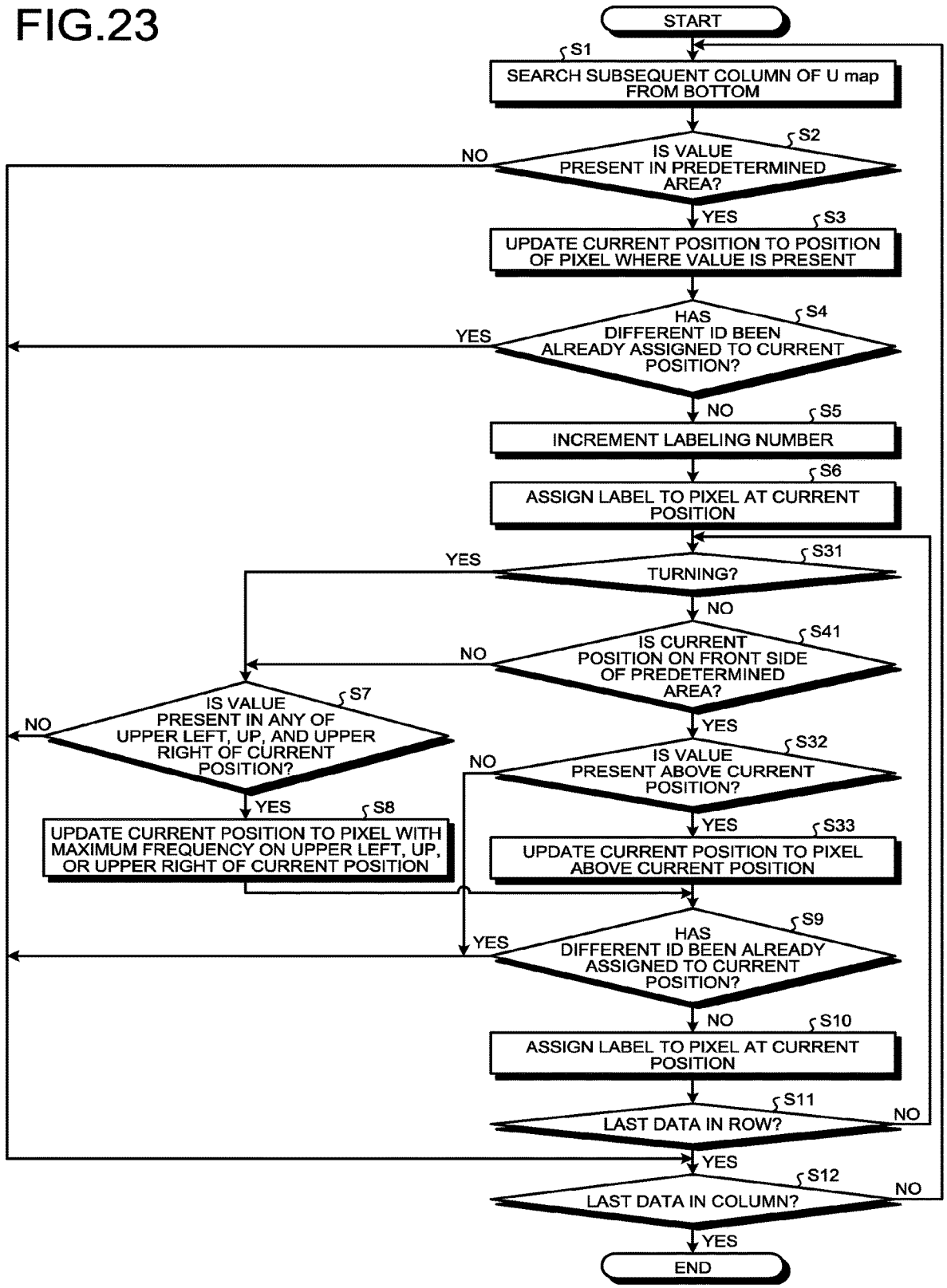
FIG. 23 is a flowchart that illustrates a process of a device control system according to a fourth embodiment selectively using a labeling process for linear walls and a labeling process for turning walls in accordance with a position on which a labeling process is conducted while the vehicle is moving in a straight line.

The flowchart of FIG. 23 illustrates the flow of a labeling process according to the fourth embodiment. In the flowchart of FIG. 23, a determination branch is provided at Step S41 subsequent to Step S31 for determining whether the vehicle is turning as explained in the third embodiment. Here, in the flowchart of FIG. 23, each operation at Step S1 to Step S12 has the same details as that of a corresponding operation at Step S1 to Step S12 in the flowchart of FIG. 9. The above explanation of the flowchart in FIG. 9 needs to be referred to for detailed explanations. Furthermore, in the flowchart of FIG. 23, each operation at Step S31 to Step S33 has the same details as that of a corresponding operation at Step S31 to Step S33 in the flowchart of FIG. 23. The above explanation of the flowchart in FIG. 23 needs to be referred to for detailed explanations.

According to the fourth embodiment, at Step S31 in the flowchart of FIG. 23, when it is determined that the vehicle is not turning at present (Step S31: No), the wall detecting unit 618 proceeds to the operation at Step S41. At Step S41, the wall detecting unit 618 determines whether the pixel for which search is currently conducted for a labeling process is a pixel located in an area on the front side of a predetermined area on the small U map on the basis of a disparity value of the pixel indicating a distance in a depth direction.

Figure 24A:
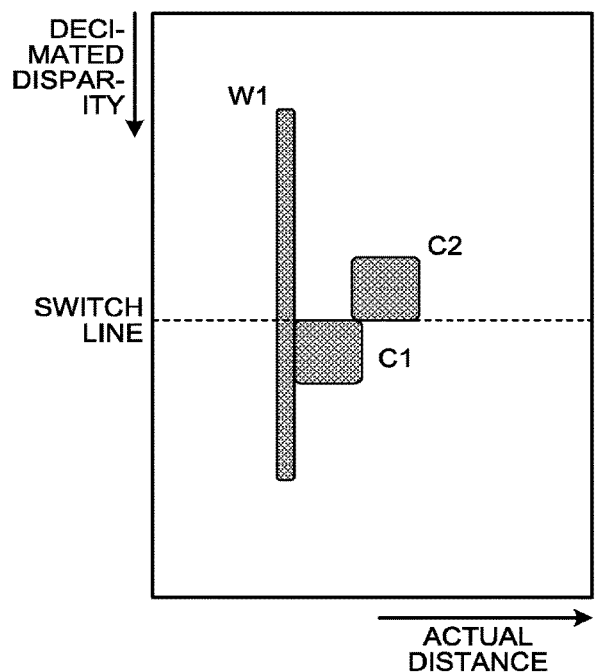
FIGS. 24A and 24B are diagrams that illustrate that a labeling process of the device control system according to the fourth embodiment is switched so that different labeling numbers are assigned to the linear wall and the two leading vehicles and the linear wall and the two leading vehicles are detectable with accuracy in a separate manner.
Figure 24B:
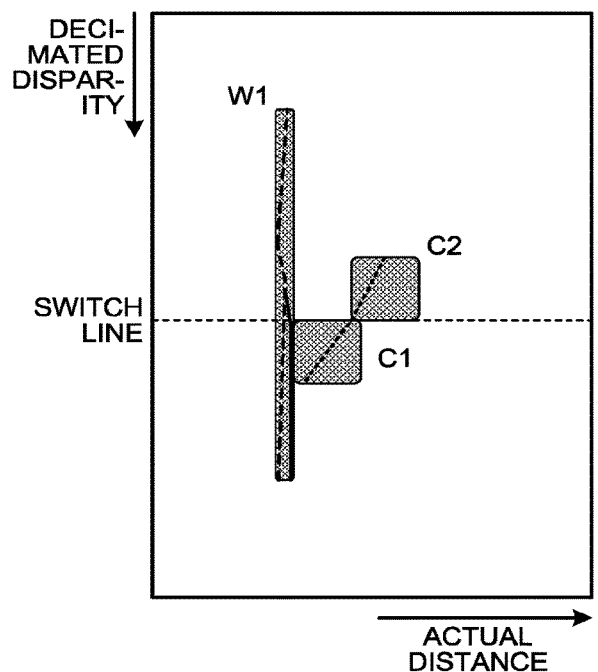

For example, according to the fourth embodiment, as illustrated in FIG. 24A, a line for switching a labeling process is between the area (the above-described area on the front side) from the shortest distance to the intermediate distance on the small U map and the area (the area on the back side) from the intermediate distance to the long distance. That is, according to the fourth embodiment, a labeling process is switched when the position of the currently searched pixel shifts from a position in the intermediate distance to a position in the long distance.

When the vehicle is currently moving in a straight line, there is a high possibility that the wall in the interval from the shortest distance to the intermediate distance on the small U map is a straight wall. Therefore, at Step S41, when it is determined that the currently searched pixel is a pixel located in the interval from the shortest distance to the intermediate distance (=less than a predetermined distance:

Step S41: Yes), the wall detecting unit 618 proceeds to the operation at Step S32 to conduct the above-described labeling process for linear walls.

However, although the wall is straight at present, there is a possibility that it is curved in a long distance. Therefore, at Step S41, when it is determined that the currently searched pixel is a pixel located in the interval from the intermediate distance to the long distance (=more than the predetermined distance: Step S41: No), the wall detecting unit 618 proceeds to the operation at Step S7 to conduct the above-described turning-wall labeling process.

That is, according to the fourth embodiment, as the vehicle is moving in a straight line, there is a high possibility that the wall in the interval from the shortest distance to the intermediate distance is a straight wall. Therefore, when the currently searched pixel is a pixel located at the area between the shortest distance and the intermediate distance, the wall detecting unit 618 conducts the above-described labeling process for linear walls, thereby continuing a labeling process on pixels in an upper direction. However, although a wall is straight at present, there is a possibility that it is curved in a long distance. Therefore, when the currently searched pixel is a pixel located at the area between the intermediate distance and the long distance, the wall detecting unit 618 conducts the above-described turning-wall labeling process that enables selection (high flexibility) of a pixel on which a labeling process is to be conducted from the above-described three pixels.

As described above, when the vehicle is currently moving in a straight line, a labeling process for wall detection is switched in accordance with the position of a pixel for which search for the labeling process is conducted; thus, as illustrated in FIG. 24B, a labeling process may be conducted to assign the identical labeling number along the wall on a small U map. Thus, the wall W1 and the leading vehicles C1, C2 are detectable with accuracy in a separate manner.

Each of the above-described embodiments is presented as an example, and there is no intension to limit the scope of the present invention. Each novel embodiment may be implemented in other various aspects, and various types of omission, replacement, and modification may be made without departing from the scope of the invention. For example, a value of a distance (distance value) and a disparity value may be treated as being equivalent. In explanation according to the above-described embodiment, disparity images are used as an example of distance images; however, this is not a limitation. For example, distance images may be generated by combining distance information generated by using a detection device such as millimeter-wave radar or laser radar with disparity images generated by using a stereo camera. Furthermore, a configuration may be such that both a stereo camera and a detection device such as millimeter-wave radar or laser radar are used and, in combination with detection results of objects by the above-described stereo camera, the accuracy of detection is further improved.

Each of the above-described embodiment and modifications of each of the embodiments are included in the scope and spirit of the invention, and they are included in the invention set forth in claims and the range of equivalents.

According to the embodiments, there is an advantage such that three-dimensional stretching objects are detectable with accuracy.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image processing device comprising:
a generating unit configured to generate, based on a distance image, two-dimensional distribution information indicating a two-dimensional distribution of an object, in which a distance in a horizontal direction, a distance in a depth direction, and a frequency value corresponding to the distance in the horizontal direction and the distance in the depth direction are related; and
a labeling unit configured to conduct a labeling process by conducting search on the two-dimensional distribution information multiple times, detecting a pixel having the frequency value that is more than a predetermined threshold during each search, and assigning a label that is different in each times of search, wherein
the labeling unit conducts a first labeling process by selecting a pixel having the frequency value that is more than the threshold from pixels that abut a pixel being searched in a search direction and assigning the label when the label is not assigned to the pixel selected.

2. The image processing device according to claim 1, wherein
the labeling unit conducts the first labeling process by conducting search in the depth direction, selecting a pixel having largest frequency value from a plurality of pixels that are searched and include a pixel being positioned in the depth direction and a pixel being positioned on right and left sides of the pixel being positioned in the depth direction, and assigning the label when the label is not assigned to the pixel selected.

3. The image processing device according to claim 2, wherein
the two-dimensional distribution information is information generated based on a distance image generated by a capturing device; and
the labeling unit conducts the first labeling process by setting a weight value to the plurality of pixels in accordance with turning information indicating a two-dimensional information generated based on a distance image captured during which the capturing device is turning, selecting a pixel based on the weight value, and assigning the label when the label is not assigned to the pixel selected.

4. The image processing device according to claim 1, wherein
when a pixel number of pixels that have no frequency value and that are present between the pixel on which a labeling process has been conducted and a next pixel on which a labeling process is conducted is more than a predetermined pixel number, the labeling unit terminates the labeling process and shifts to a labeling process to assign a subsequent label and, when the pixel number of pixels having the frequency value is less than the predetermined pixel number, continuously conducts the labeling process.

5. The image processing device according to claim 1, wherein
when a labeling process is conducted on the pixel, the labeling unit assigns a label identical to a label of the pixel on which a labeling process has been conducted to both or either of pixels on immediate right and left of the pixel.

6. The image processing device according to claim 1, wherein
the labeling unit is configured to
conduct the first labeling process or a second labeling process during which, when a single pixel abutting a pixel being searched in the search direction has the frequency value that is more than the threshold and has no label assigned thereto, a label that corresponds to the number of times of search is assigned,
conduct the first labeling process when it is determined, based on turning information indicating that the two-dimensional distribution information is two-dimensional distribution information generated based on a distance image captured while a capturing device is turning, that the two-dimensional distribution information on which a labeling process is conducted is two-dimensional distribution information that corresponds to a distance image captured while the capturing device is turning, and
conduct the second labeling process when it is determined based on the turning information that the two-dimensional distribution information on which the labeling process is conducted is two-dimensional distribution information that corresponds to a distance image captured while the capturing device is moving in a straight line.

7. The image processing device according to claim 6, wherein
when it is determined based on the turning information that the two-dimensional distribution information on which the labeling process is conducted is two-dimensional distribution information that corresponds to a distance image captured while the capturing device is moving in a straight line, the labeling unit determines a distance in a depth direction based on a distance value of a pixel on which a labeling process is conducted, conducts the second labeling process when the pixel is a pixel in an area that corresponds to a distance less than a predetermined distance in a depth direction, and conducts the first labeling process when the pixel is a pixel in an area that corresponds to a distance more than the predetermined distance in a depth direction.

8. The image processing device according to claim 1, wherein
when a label has been already assigned during a previous labeling process while a subsequent labeling process is conducted on a pixel, and when an interval between each pixel labelled during the previous labeling process and each pixel labelled during the subsequent labeling process is less than a predetermined interval, the labeling unit assigns a label identical to a label of a pixel that has previously undergone the labeling process to all pixels that correspond to the subsequent labeling process.

9. The image processing device according to claim 1, wherein
the labeling unit conducts search on a column-by-column basis from an outer side of the two-dimensional distribution information.

10. The image processing device according to claim 1, wherein
the labeling unit conducts search by one column alternately from side to side of the two-dimensional distribution information, starting from an extreme left column and an extreme right column to a central column in sequence in such a manner that the extreme left column of the two-dimensional distribution information is searched during first search, the extreme right column of the two-dimensional distribution information is searched during second search, a second column adjacent to the extreme left column of the two-dimensional distribution information is searched during third search, and a second column adjacent to the extreme right column of the two-dimensional distribution information is searched during fourth search.

11. The image processing device according to claim 1, wherein
the labeling unit sequentially conducts search from the extreme left column to the central column in the two-dimensional distribution information and, after search in the central column is finished, sequentially conducts search from the extreme right column of the two-dimensional distribution information to a column on immediate right of the central column.

12. An image processing method comprising:
by a generating unit, a generating step of generating, based on a distance image, two-dimensional distribution information indicating a two-dimensional distribution of an object, in which a distance in a horizontal direction, a distance in a depth direction, and a frequency value corresponding to the distance in the horizontal direction and the distance in the depth direction are related; and by a labeling unit, a labeling step of conducting a labeling process by conducting search on the two-dimensional distribution information multiple times, detecting a pixel having the frequency value that is more than a predetermined threshold during each search, and assigning a label that is different in each times of search, wherein the labeling step includes conducting a first labeling process by selecting a pixel having the frequency value more than the threshold from pixels that abut a pixel being searched in a search direction and assigning the label when the label is not assigned to the pixel selected.

13. A non-transitory computer-readable recording medium that contains a computer program that causes a computer to function as:

a generating unit configured to generate, based on a distance image, two-dimensional distribution information indicating a two-dimensional distribution of an object, in which a distance in a horizontal direction, a distance in a depth direction, and a frequency value corresponding to the distance in the horizontal direction and the distance in the depth direction are related; and a labeling unit configured to conduct a labeling process by conducting search on the two-dimensional distribution information multiple times, detecting a pixel having the frequency value that is more than a predetermined threshold during each search, and assigning a label that is different in each times of search, wherein the labeling unit conducts a first labeling process by selecting a pixel having the frequency value more than the threshold from pixels that abut a pixel being searched in a search direction and assigning the label when the label is not assigned to the pixel selected.

14. An object recognition device comprising:

a generating unit configured to generate, based on a distance image, two-dimensional distribution information indicating a two-dimensional distribution of an object, in which a distance in a horizontal direction, a distance in a depth direction, and a frequency value corresponding to the distance in the horizontal direction and the distance in the depth direction are related;

a labeling unit configured to conduct, during a labeling process of conducting search on the two-dimensional distribution information multiple times, detecting a pixel having the frequency value that is more than a predetermined threshold during each search, and assigning a label that is different in each times of search, a first labeling process by selecting a pixel having the frequency value more than the threshold from pixels that abut a pixel being searched in a search direction and assigning the label that corresponds to the number of times of search when the label is not assigned to the pixel selected; and a detecting unit configured to detect an object from the two-dimensional distribution information by regarding pixels with the identical label assigned thereto as pixels of an identical object.

15. A device control system comprising:

the image processing device according to claim 1;

a detecting unit configured to detect an object from the two-dimensional distribution information by regarding pixels with the identical label assigned thereto as pixels of an identical object; and a control unit configured to control operation of a device that is a control target in accordance with a detection result of the detecting unit.

16. A movable body comprising the device control system according to claim 15, wherein the movable body is controlled by the control unit.

* * * * *